United States Patent
B'Far et al.

(10) Patent No.: US 8,954,309 B2
(45) Date of Patent: *Feb. 10, 2015

(54) TECHNIQUES FOR APPLICATION TUNING

(75) Inventors: Reza B'Far, Huntington Beach, CA (US); Kent Spaulding, Portland, OR (US); Americo Caves, Irvine, CA (US)

(73) Assignee: Oracle International Corporation, Redwood Shores, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 13/149,663

(22) Filed: May 31, 2011

(65) Prior Publication Data

US 2012/0310618 A1 Dec. 6, 2012

(51) Int. Cl.
| | |
|---|---|
| *G06F 9/44* | (2006.01) |
| *G06F 13/10* | (2006.01) |
| *G06F 13/12* | (2006.01) |
| *G06F 11/30* | (2006.01) |
| *G06F 11/34* | (2006.01) |

(52) U.S. Cl.
CPC .......... *G06F 11/3051* (2013.01); *G06F 11/302* (2013.01); *G06F 11/3447* (2013.01); *G06F 11/3457* (2013.01)
USPC ................. 703/21; 703/13; 703/22; 717/101; 717/121

(58) Field of Classification Search
CPC ............ G06F 2217/08; G06F 2217/10; G06F 11/203; G06F 11/3051; G06F 11/3447; G06F 11/3452; G06F 11/3457; G06F 17/50; G06F 17/5009; G06F 11/3684; G06F 11/3688; G05B 13/04; G05B 13/041; G05B 13/042
USPC ................. 703/13, 21, 22; 717/101, 104, 121, 717/124–135, 151
See application file for complete search history.

(56) References Cited

U.S. PATENT DOCUMENTS

| | | | | |
|---|---|---|---|---|
| 5,630,025 | A | * | 5/1997 | Dolby et al. .................... 706/46 |
| 5,983,272 | A | | 11/1999 | Rosen et al. |
| 6,076,083 | A | | 6/2000 | Baker |
| 6,381,564 | B1 | * | 4/2002 | Davis et al. .................... 703/22 |
| 6,801,883 | B1 | | 10/2004 | Hurlock |
| 6,917,840 | B2 | * | 7/2005 | Lund .............................. 700/33 |
| 6,980,939 | B2 | * | 12/2005 | Dhir et al. ......................... 703/7 |
| 7,050,863 | B2 | * | 5/2006 | Mehta et al. ................... 700/29 |
| 7,092,845 | B2 | * | 8/2006 | Keane et al. .................. 702/182 |
| 7,266,847 | B2 | | 9/2007 | Pauker et al. |
| 7,340,469 | B1 | | 3/2008 | Alghathbar et al. |

(Continued)

OTHER PUBLICATIONS

Yilmaz et al, "Main Effects Screening: A Distributed Continuous Quality Assurance Process for Monitoring Performance Degradation in Evolving Software Systems", ICSE, 2005.*

(Continued)

*Primary Examiner* — Mary C Jacob
(74) *Attorney, Agent, or Firm* — Kilpatrick Townsend and Stockton LLP

(57) ABSTRACT

Techniques for tuning systems generate configurations that are used to test the systems to determine optimal configurations for the systems. The configurations for a system are generated to allow for effective testing of the system while remaining within budgetary and/or resource constraints. The configurations may be selected to satisfy one or more conditions on their distributions to ensure that a satisfactory set of configurations are tested. Machine learning techniques may be used to create models of systems and those models can be used to determine optimal configurations.

20 Claims, 12 Drawing Sheets

(56) References Cited

U.S. PATENT DOCUMENTS

| | | | |
|---|---|---|---|
| 7,379,890 B2* | 5/2008 | Myr et al. | 705/7.35 |
| 7,467,333 B2* | 12/2008 | Keeton et al. | 714/41 |
| 7,493,630 B2* | 2/2009 | Hunt | 719/330 |
| 7,539,676 B2 | 5/2009 | Aravamudan | |
| 7,630,877 B2* | 12/2009 | Brown et al. | 703/21 |
| 7,657,935 B2 | 2/2010 | Stolfo et al. | |
| 7,734,564 B2* | 6/2010 | Kaseda et al. | 706/62 |
| 7,770,151 B2* | 8/2010 | Sanjar et al. | 717/109 |
| 8,024,682 B2* | 9/2011 | McConaghy et al. | 716/106 |
| 8,131,677 B2 | 3/2012 | Hsu | |
| 8,204,719 B2 | 6/2012 | Diao et al. | |
| 8,307,343 B2* | 11/2012 | Chaudhuri et al. | 717/128 |
| 8,312,171 B2 | 11/2012 | B'Far et al. | |
| 8,315,960 B2* | 11/2012 | Chen et al. | 706/15 |
| 8,438,378 B2* | 5/2013 | Lazar | 713/100 |
| 2003/0088449 A1 | 5/2003 | Menninger | |
| 2003/0135354 A1* | 7/2003 | Gabele et al. | 703/13 |
| 2003/0229478 A1* | 12/2003 | Rappaport et al. | 703/13 |
| 2004/0093344 A1 | 5/2004 | Berger et al. | |
| 2004/0210654 A1 | 10/2004 | Hrastar | |
| 2005/0007249 A1 | 1/2005 | Eryurek et al. | |
| 2005/0097449 A1 | 5/2005 | Lumera et al. | |
| 2005/0262230 A1* | 11/2005 | Liu et al. | 709/223 |
| 2006/0025985 A1* | 2/2006 | Vinberg et al. | 703/22 |
| 2006/0212486 A1 | 9/2006 | Kennis et al. | |
| 2006/0262740 A1 | 11/2006 | Schirmer et al. | |
| 2007/0143338 A1 | 6/2007 | Wang et al. | |
| 2007/0174106 A1 | 7/2007 | Aniszczyk et al. | |
| 2007/0192863 A1 | 8/2007 | Kapoor et al. | |
| 2008/0010609 A1 | 1/2008 | Curtis et al. | |
| 2008/0256121 A1 | 10/2008 | Liu et al. | |
| 2008/0282321 A1 | 11/2008 | Hecht et al. | |
| 2009/0112780 A1* | 4/2009 | Chen et al. | 706/19 |
| 2009/0183227 A1 | 7/2009 | Isaacs et al. | |
| 2009/0198474 A1 | 8/2009 | Fritz et al. | |
| 2009/0300002 A1 | 12/2009 | Thomas et al. | |
| 2009/0319092 A1 | 12/2009 | Piche | |
| 2009/0328222 A1 | 12/2009 | Helman et al. | |
| 2010/0174754 A1 | 7/2010 | B'Far et al. | |
| 2010/0218134 A1 | 8/2010 | B'Far et al. | |
| 2010/0250779 A1 | 9/2010 | B'Far et al. | |
| 2012/0005631 A1 | 1/2012 | B'Far et al. | |
| 2012/0030202 A1 | 2/2012 | B'Far et al. | |
| 2012/0310870 A1 | 12/2012 | Caves et al. | |

OTHER PUBLICATIONS

Palmero et al, "ReSPIR: A Response Surface-Based Pareto Iterative Refinement for Application-Specific Design Space Exploration", IEEE Transactions on Computer-Aided Design of Integrated Circuits and Systems, vol. 28, No. 12, Dec. 2009.*

Boning et al, "DOE/Opt: A System for Design of Experiments, Response Surface Modeling, and Optimization Using Process and Device Simulation", Texas Instruments Semiconductor Process and Design Center, Dec. 7, 1993.*

Bates et al, "Formulation of the Audze-Eglais Uniform Latin Hypercube Design of Experiments", Advances in Engineering Software 34, pp. 493-506, 2003.*

Duan et al, "Tuning Database Configuration Parameters with iTuned", VLDB, Aug. 24-28, 2009.*

Chen et al, "Experience Transfer for the Configuration Tuning in Large-Scale Computing Systems", IEEE Transactions on Knowledge and Data Engineering, vol. 23, No. 3, Mar. 2011.*

Koch et al, "Interdigitation for Effective Design Space Exploration Using iSIGHT", Struct. Multidisc. Optim. 23, pp. 111-126, 2002.*

Cheng et al, "Latin Hypercube Sampling in Bayesian Networks", FLAIRS-00 Proceedings, 2000.*

Simpson et al, "Metamodels for Computer-based Engineering Design: Survey and Recommendations", Engineering with Computers 17, pp. 129-150, 2001.*

Thonangi et al, "Finding Good Configurations in High-Dimensional Spaces: Doing More with Less", IEEE International Symposium on Modeling, Analysis and Simulation of Computers and Telecommunication Systems, 2008.*

Xi et al, "A Smart Hill-Climbing Algorithm for Application Server Configuration", WWW2004, May 17-22, 2004.*

Bates et al., "Formulation of the Audze-Eglais Uniform Latin Hypercube Design of Experiments," *Advances in Engineering Software*, vol. 34, 2003, pp. 493-506.

Bates et al., "Formulation of the Optimal Latin Hypercube Design of Experiments Using a Permutation Genetic Algorithm," *Proceedings of the In 45th AIAA/ASME/ASCE/AHS/ASC Structures, Structural Dynamics and Materials Conference*, Apr. 2004.

Bishop, Christopher M., *Pattern Recognition and Machine Learning*, Springer, New York, NY (2006).

Bruns, et al., "A Simple and Expressive Semantic Framework for Policy Composition in Access Control," *ACM SIG on Security, Audit and Control*, 10pp (2007).

Chung, I-Hsin and Jeffery Collingsworth, "A Case Study Using Automatic Performance Tuning for Large Scale Scientific Programs," *15th IEEE International Conference on High Performance Distributed Computing*, 2006, pp. 45-56.

Codd, E. F., "A Relational Model of Data for Large Shared Data Banks," *Communications of the ACM*, vol. 13, No. 6, pp. 377-387 (Jun. 1970).

Cook, Henry and Kevin Skadron, "Predictive Design Space Exploration Using Genetically Programmed Response Surfaces," *Proceedings of the 45th ACM/IEEE Conference on Design Automation (DAC)*, Jun. 2008.

De Luca, Ernesto William and Andreas Nurnberger, "Ontology-Based Semantic Online Classification of Documents: Supporting Users in Searching the Web," *Proc. of the European Symposium on Intelligent Technologies (EUNITE)*, 9pp., (2004).

Fukunaga, Keinosuke, *Statistical Pattern Recognition*, Morgan Kaufmann, San Francisco, CA (1990).

Goldberg, David, *Genetic Algorithms in Search Optimization and Machine Learning*, 1989, Table of Contents & pp. 41-45, Addison Wesley.

Gray, Jim, "The Transaction Concept: Virtues and Limitations," *Proceedings of the 7th International Conference on Very Large Data Bases*, pp. 144-154, Tandem Computers: Cupertino, CA (Sep. 1983).

Hassoun, Mohamad H., *Fundamentals of Artificial Neural Networks*, 1995, MIT Press.

Huynh, et al., "The Semantic User Interface Paradigm for Presenting Semi-structured Information," 2pp, MIT Artificial Intelligence Laboratory, Cambridge, MA (2002).

Ipek et al., "An Approach to Performance Prediction for Parallel Applications," *EURO-PAR* 2005, pp. 196-205.

Ipek et al., "Efficiently Exploring Architectural Design Spaces via Predictive Modeling," *ASPLOS*, 2006, pp. 195-206.

Kennedy, J. and R. Eberhart, "Particle Swarm Optimization," *Proceedings of IEEE International Conference on Neural Networks*, vol. 4, 1995, pp. 1942-1948.

Li et al., "Accurate and Efficient Processor Performance Prediction via Regression Tree Based Modeling," *Journal of Systems Architecture*, vol. 55, 2009, pp. 457-467.

Nelder, John and R. Mead, "A Simplex Method for Function Minimization," *The Computer Journal*, vol. 7 (4), 1965, pp. 308-313.

Ozisikyilmaz et al., "Efficient System Design Space Exploration Using Machine Learning Techniques," *Proceedings of the Design Automation Conference (DAC)*, Jun. 2008, pp. 966-969.

Ribler et al., "Autopilot: Adaptive Control of Distributed Application," *Proceedings of the 7th IEEE Symposium on High-Performance Distributed Computing*, Jul. 1998, Chicago, Illinois.

Russel, Stuart and Peter Norvig, *Artificial Intelligence: A Modern Approach*, 2003, Prentice Hall.

Russell, et al., "Nitelight: A Graphical Tool for Sematic Query Construction," in *Semantic Web User Interaction Workshop (SWUI)*, 10pp., Florence, Italy (Apr. 2008).

Stanford Center for Biomedical Informatics Research, "The Protégé Ontology Editor and Knowledge Acquisition System," 1pg. http://protege.stanford.edu/ (accessed Jun. 2010).

Taylor, James with Neil Raden, *Smart (Enough) Systems*, Prentice Hall, Boston, MA (2007).

Weiss, Sholom and Casimir Kulikowski, *Computer Systems That Learn*, Morgan Kaufmann, San Mateo, CA (1991).

(56) References Cited

OTHER PUBLICATIONS

Yahoo! Inc., "Pipes: Rewire the Web," No Date Given. http://pipes.yahoo.com/pipes/ (accessed Jun. 2010).
Yoo et al., "Constructing a Non-Linear Model with Neural Networks for Workload Characterization," *Proceedings of the 2006 IEEE International Symposium on Workload Characterization*, Oct. 2006, pp. 150-159, San Jose, California.
U.S. Appl. No. 12/684,065, Final Office Action, mailed Feb. 13, 2012; 20 pages.
U.S. Appl. No. 12/684,065; Final Office Action, mailed Apr. 4, 2013, 26 pages.
U.S. Appl. No. 12/684,065, Non-Final Office Action, mailed Oct. 7, 2011; 18 pages.
U.S. Appl. No. 12/684,065, Non-Final Office Action, mailed Oct. 18, 2012; 28 pages.
U.S. Appl. No. 12/714,206, Final Office Action, mailed Apr. 10, 2013; 13 pages.
U.S. Appl. No. 12/714,206, Non-Final Office Action, mailed Dec. 28, 2012; 14 pages.
U.S. Appl. No. 12/749,224, Non-Final Office Action, mailed Nov. 9, 2011; 15 pages.
U.S. Appl. No. 12/749,224, Notice of Allowance, mailed Jul. 11, 2012, 8 pages.
U.S. Appl. No. 12/827,068, Final Office Action, mailed May 24, 2013; 13 pages.
U.S. Appl. No. 12/827,068, Non-Final Office Action, mailed Jun. 8, 2012; 12 pages.
U.S. Appl. No. 12/846,684; Final Office Action, mailed Mar. 1, 2013; 31 pages.
U.S. Appl. No. 12/846,684, Non-Final Office Action, mailed Aug. 21, 2012; 24 pages.
Dean et al., "MapReduce: Simplified Data Processing on Large Clusters", Proceedings of the 6th Symposium on Operating Systems Design and Implementation (OSDI '04), 2004, pp. 137-149.
U.S. Appl. No. 12/684,065, "Notice of Allowance", Sep. 11, 2013, 9 pages.
U.S. Appl. No. 12/846,684, "Non-Final Office Action", Oct. 21, 2013, 25 pages.
U.S. Appl. No. 12/827,068 Non-Final Office Action mailed Dec. 19, 2013, 13 Pages.
U.S. Appl. No. 13/149,701 Non-Final Office Action mailed Mar. 11, 2014, 14 pages.
U.S. Appl. No. 12/846,684 Final Office Action mailed Mar. 14, 2014, 35 pages.
Peng et al., "PSO for Solving RCPSP", Chinese Control and Decision Conference, 2008, 5 pages.
U.S. Appl. No. 12/714,206 Non-Final Office Action mailed on Jun. 19, 2014, 12 pages.
U.S. Appl. No. 13/149,701, Notice of Allowance mailed on Jul. 30, 2014 14 pages.
U.S. Appl. No. 14/107,991, Non-Final Office Action mailed on Jun. 2, 2014, 12 pages.
Notice of Allowance for U.S. Appl. No. 12/846,684 mailed on Oct. 7, 2014, 11 pages.

\* cited by examiner

10(A) Valid LH with U = 1.125

10(B) Optimal, but invalid LH with U = .625

10(C) OLH with U = .9

|         | 2 x 120              | 3 x 120                | 5 x 50                  | 5 x 120                 | 10 x 10              | 10 x 50               | 10 x 120              |
|---------|----------------------|------------------------|-------------------------|-------------------------|----------------------|-----------------------|-----------------------|
| permGA  | 5.5174 (130,570)     | 1.9613 (1,996,920)     | .7270 (1,996,840)       | .7930 (1,998,540)       | —                    | —                     | —                     |
| myPermGA| 5.51699 (1,759,000)  | 1.94841 (20,000,000)   | .727149 (11,291,200)    | .79396 (17,495,000)     | .253512 (2,657,200)  | .313864 (8,721,800)   | .329069 (6,596,400)   |
| permPSO | 5.53196 (33,580)     | 1.94577 (143,800)      | .722644 (218,500)       | .788504 (231,700)       | .246185 (50,600)     | .310714 (793,400)     | .326905 (218,850)     |

FIG. 11

TECHNIQUES FOR APPLICATION TUNING

CROSS-REFERENCES TO RELATED APPLICATIONS

This application is relating to co-pending U.S. patent application Ser. No. 13/149,701, filed May 31, 2011, entitled "Application Configuration Generation," which is hereby incorporated herein by reference for all purposes.

BACKGROUND OF THE INVENTION

One of the biggest issues in configuration of enterprise and other applications is to ensure optimal performance given the hardware and software platform they are deployed on throughout the life cycle of the application. While application tuning can be done during the initial installation, such tuning can be rendered useless throughout the life-cycle of the application by the fact that the nature of the data may change. In addition, many variables may force an application to be configured in a way that results in less than optimal performance.

Processes, such as enterprise applications, can contain numerable configurable parameters, resulting in large numbers of possible configurations. Determining which configuration will produce the best desired performance under a particular usage pattern is a difficult problem that often requires intricate knowledge of the complex interdependencies among the various parameters under different workloads. In many contexts, this requires expertise in enterprise application tuning. The acquisition of this expertise can be not only nontrivial, but also time-consuming. In addition, because an application may have different optimal performance points, tuning an application based on workload type and tuning an application instance are two different problems since the performance of an application instance likely depends on its state.

One way to tune an application is to perform experiments that measure how the application performs when configured with different configurations. An application, however, takes time to test and, while being tested, the application may utilize computing resources that could be used for other purposes. Due to the large number of configurations, budgets and resources may not allow for the testing of all configurations.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In an embodiment, a computer-implemented method of determining system configurations is performed under the control of one or more computer systems configured with executable instructions. The method may include determining a set of configurations for a system; measuring performance of the system for members of the determined set of configurations; creating, based at least in part on the measured performance, a model of the system; generating, based at least in part on the model, one or more configurations; and providing the generated one or more configurations for tuning the system.

Variations of the method are also considered as being within the scope of the present disclosure. For example, the method may further comprise tuning the system according to at least one of the generated one or more configurations. Determining the set of configurations may include testing at least a first set of configurations for the system to determine a set of configuration constraints; and selecting the set of configurations from within the determined set of configuration constraints. Determining the set of constraints may include modeling the system to determine the set of configuration constraints. Selecting the set of configurations may include selecting the set of configurations to have a distribution that satisfies one or more distribution conditions. Measuring the performance of the system for each configuration may include configuring the system with the configuration; simulating the configured system; and measuring one or more performance characteristics of the system.

In another embodiment, a computing system for determining configurations for a system under test, which may be a system for which configurations are generated to determine an optimal set of configurations, is disclosed. The computing system may include one or more processors; and memory including executable instructions that, when executed by the one or more processors, cause the computing system to implement at least a configuration selector, an application simulator, a model creator, and a model optimizer. The configuration selector may be configured to select a set of configurations for the system under test. The application simulator may be configured to simulate the system under test under the selected set of configurations and provide, based at least in part on simulating the system under test, performance data for the system under test. The model creator may be configured to create, based at least in part on the provided performance data, a model of the system under test. The model optimizer may be configured to determine, based at least in part on the created model, one or more configurations for the system under test. The system under test may be an application which may be on a host system.

As with any embodiment described or suggested herein, the variations of the computing system are considered as being within the scope of the present disclosure. For example, the configuration selector may include a configuration validator, a classification trainer, and/or a configuration generator. The configuration validator may be configured to determine whether configurations are valid and the configuration selector may avoid selecting invalid configurations. The classification trainer may be configured to learn constraints for configurations and the configuration selector may select the set of configurations from within the learned constraints. The configuration generator may be configured to generate valid configurations within a set of constraints and the configuration selector may select the set of configurations from the generated valid configurations. The configuration selector may be configured to select the set of configurations in a manner satisfying one or more configuration distribution conditions.

In accordance with another embodiment, one or more computer-readable storage media having collectively stored thereon instructions executable by one or more processors to cause a computer system to generate and provide configurations are disclosed. The instructions, when executed by the one or more processors, cause the computer system to determine a set of configurations for the system; measure performance of the system for members of the determined set of configurations; create, based at least in part on the measured performance, a model of the system; generate, based at least in part on the model, one or more configurations; and provide the generated one or more configurations for tuning the system.

Determining the set of configurations may include testing at least a first set of configurations for the system to determine a set of configuration constraints; and selecting the set of configurations from within the determined set of configuration constraints. Determining the set of constraints may include modeling the system to determine the set of configuration constraints. Selecting the set of configurations may include selecting the set of configurations to have a distribution that satisfies one or more distribution conditions. Measuring performance of the system for each configuration may include configuring the system with the configuration, simulating the configured system and measuring one or more performance characteristics of the system. The set of configurations, in an embodiment, is a proper subset of a set of possible configurations for the system. Each configuration may comprise a plurality of configurable parameters of the system. Simulating the configured system may include causing virtual users of the system to interact with the system.

In an embodiment, a computer-implemented method of determining system configurations that may be performed under the control of one or more computer systems configured with executable instructions is discussed. The method, in an embodiment, includes determining a set of configurations for a system; generating a set of testing results by at least testing the validity of configurations in the set of configurations; creating, based at least in part on the testing results, a model that defines one or more configuration constraints; determining, based at least in part on the generated model, an updated set of configurations that are valid according to the defined configuration constraints of the generated model; and providing the updated set of configurations for testing the system.

Generating the set of testing results may include operating the system under the configurations. The method may also further comprise operating the system under the configurations of the updated set of configurations; measuring performance of the operated system to generate a second set of testing results; creating, based at least in part on the second testing results, a second model by at least testing the system under the configurations of the updated set of configurations; and using the second model to determine at least one optimal configuration for the system. The updated set of configurations may be generated to form an optimal Latin hypercube. Creating the model may include determining at least one configuration constraint without prior knowledge of the configuration constraint. Determining the updated set of configurations may include performing a particle swarm optimization algorithm to determine the updated set of configurations and the particle swarm optimization algorithm may be a permutation particle swarm optimization algorithm.

In another embodiment, a computing system for generating configurations for a system under test includes one or more processors and memory including executable instructions that, when executed by the one or more processors, cause the computing system to implement at least a configuration validator, a trainer, and a configuration generator. The configuration validator may be configured to generate validity data that indicates whether configurations are valid. The trainer may be configured to determine, based at least in part on the generated validity data, one or more configuration constraints. The configuration generator may be configured to generate configurations within the determined one or more configuration constraints.

The computing system may be configured to operate the configuration validator, the trainer, and the configuration generator iteratively to determine a set of configurations for testing the system. The configuration generator generates configurations to satisfy one or more distribution conditions for the configurations. The trainer may train a model and determines, based at least in part on the trained model, the one or more configuration constraints. The configuration validator includes a tester configured to test the system under the generated configurations.

In another embodiment, one or more computer-readable storage media having collectively stored thereon instructions executable by one or more processors to cause a computer system to generate configurations are disclosed. The instructions, when executed by the one or more processors, may cause the computer system to at least determine a set of configurations for a system; generate a set of testing results by at least testing the validity of configurations in the set of configurations; create, based at least in part on the testing results, a model that defines one or more configuration constraints; determine, based at least in part on the generated model, an updated set of configurations that are valid according to the defined configuration constraints of the generated model; and provide the updated set of configurations for testing the system.

Generating the set of testing results includes operating the system under the configurations. The one or more computer-readable storage media may further include instructions executable by the one or more processors to cause the computer system to further: operate the system under the configurations of the updated set of configurations; measure performance of the operated system to generate a second set of testing results; create, based at least in part on the second testing results, a second model by at least testing the system under the configurations of the updated set of configurations; and use the second model to determine at least one optimal configuration for the system. The updated set of configurations, in an embodiment, forms an optimal Latin hypercube. Creating the model may include determining at least one configuration constraint without prior knowledge of the configuration constraint. Determining the updated set of configurations may include performing a particle swarm optimization algorithm, which may be a permutation particle swarm optimization algorithm, to determine the updated set of configurations. As above, the system may be an application on a host system.

BRIEF DESCRIPTION OF THE DRAWINGS

FIG. 11 shows a table of experimental results that were generated in an embodiment.

DETAILED DESCRIPTION OF THE INVENTION

Figure 1:
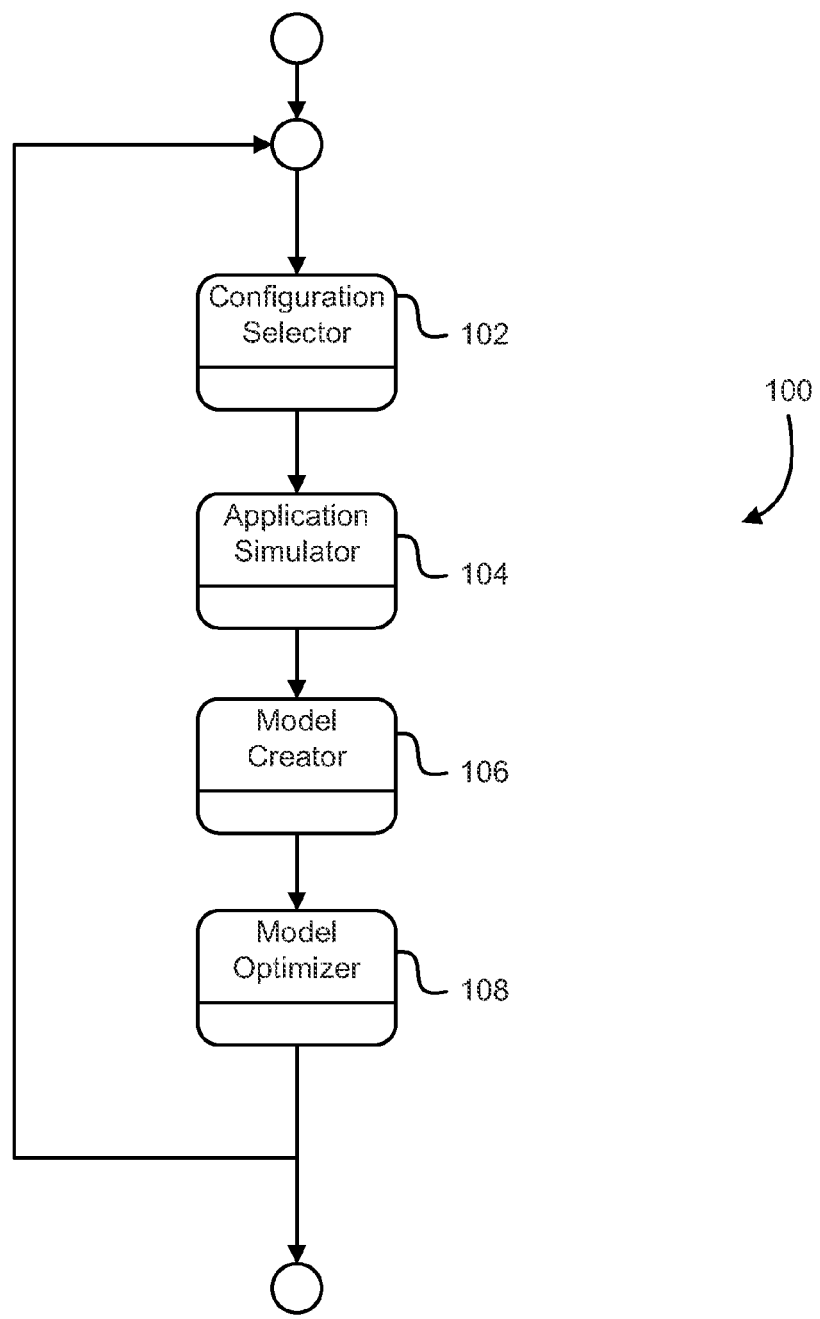
FIG. 1 shows an illustrative example of a system that may be used to implement various embodiments of the invention.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. The following description describes an embodiment of the present invention in the application testing domain. However, the scope of the present invention is not restricted to applications, but may be applied to other domains or applications. For example, any domain or application where systems configurations can be tested may make use of the present invention.

Embodiments of the present disclosure relate to generating configurations for a system and using those configurations to determine optimal configurations for the system. In an embodiment, techniques to create a decision support system are used to tune the configuration settings of systems, such as complex information technology (IT) applications. A system in accordance with an embodiment may use two statistical models that capture the constraints between various configuration settings and 2) capture the relationship of configuration settings to performance characteristics for various user-provided system workloads. In an embodiment, both models are created using closed-loop training techniques. The process and system, in an embodiment, may create the second model for performance tuning.

In an embodiment, the first model is used, along with design of experiment techniques, to find an optimal set of simulations to employ in order to collect data that is used to create the second model. The second model, in an embodiment, predicts performance based on configuration settings, and can also be used, via optimization techniques, to recommend configuration settings to tune an application's performance so that it meets given goals. The system may be configured as a generalized off-line automated process for creating a statistical model of the performance characteristics of a system, which may be then coupled with an optimization algorithm to create a decision support system (DSS) that recommends configuration settings that will best achieve desired performance characteristics. The process and system may combine and adapt a number of algorithms for optimization, machine learning, and statistical analysis. In an embodiment, the system is configured to model and optimize enterprise applications, but can be adapted to tune any configurable system, such as configurable IT applications or, generally, automated processes.

In an embodiment, configurations used to test a system to determine optimal configurations for the system utilize a design of experiment (DoE) process that, in the presence of a mechanism for testing the validity of a given experiment (test of the system under a configuration), removes the need to know the constraints in advance. The process may use a closed-loop process for finding a DoE that, given a variable domain and a "validity tester," creates a set of experiments that does not need a priori knowledge of variable constraints. Thus, an advantage is obtained since the process allows capture of known constraints but does not require knowledge of all constraints in advance. The process includes use of a variable domain definition, a target number of experiments, and a way of testing whether or not a given experiment is valid according to a set of constraints, which may be referred to as a "tester."

The process, in an embodiment, begins by performing a DoE, based at least in part on the variable domain and number of desired experiments. The process may then use the tester to test all of the proposed experiments for validity, noting those that are and are not valid in validity results. These validity results may be used to train a statistical model of the tester. That model can outperform the tester by several orders of magnitude. With a model, the model may be used to re-run the DoE, excluding any experiments that are invalid according to the model. The resulting experiments may be tested using the slower tester, and the model may be refined. This process may repeat until there are enough experiments and a model of the tester that meets an acceptable level of quality. This process, therefore, removes the need for the user to know all of the variable constraints in advance, results in a good DoE, and also produces a validity tester model that can be used for purposes other than DoE.

As discussed, techniques, including systems and methods, described herein, relate to automated processes that make few or no assumptions about a system's tunable parameters. The techniques can, therefore, be adapted to automatically suggest a configuration for best achievable performance for many different systems in many different states. FIG. 1 shows an illustrative example of a system 100 that may be used to implement the processes described and suggested herein. In an embodiment, the system 100 includes a plurality of components that each playa role in a process for suggesting configurations. Each of the components may be implemented various ways. In an embodiment, a computer system is configured with instructions that are executed by one or more processors, thereby causing each component to function according to its role in the process. In an embodiment, the system includes four components: a configuration selector 102, an application simulator 104, a model creator 106, and a model optimizer 108. FIG. 1 shows how information my flow among the components, in accordance with various embodiments.

Performance data for an application is obtained by observing the application during short representative runs (also called "simulations") under different configurations and workloads. Each configuration and workload pair may require a representative run of the application, and each representative run of the application may be time-consuming. Accordingly, in an embodiment, the configuration selector 102 uses design of experiments (DoE) techniques to find a set of valid configurations to feed into an application simulator. In an embodiment, the configuration selector uses processes that are designed to find a minimal set of configurations that will produce the best possible performance model of the application.

Figure 2:
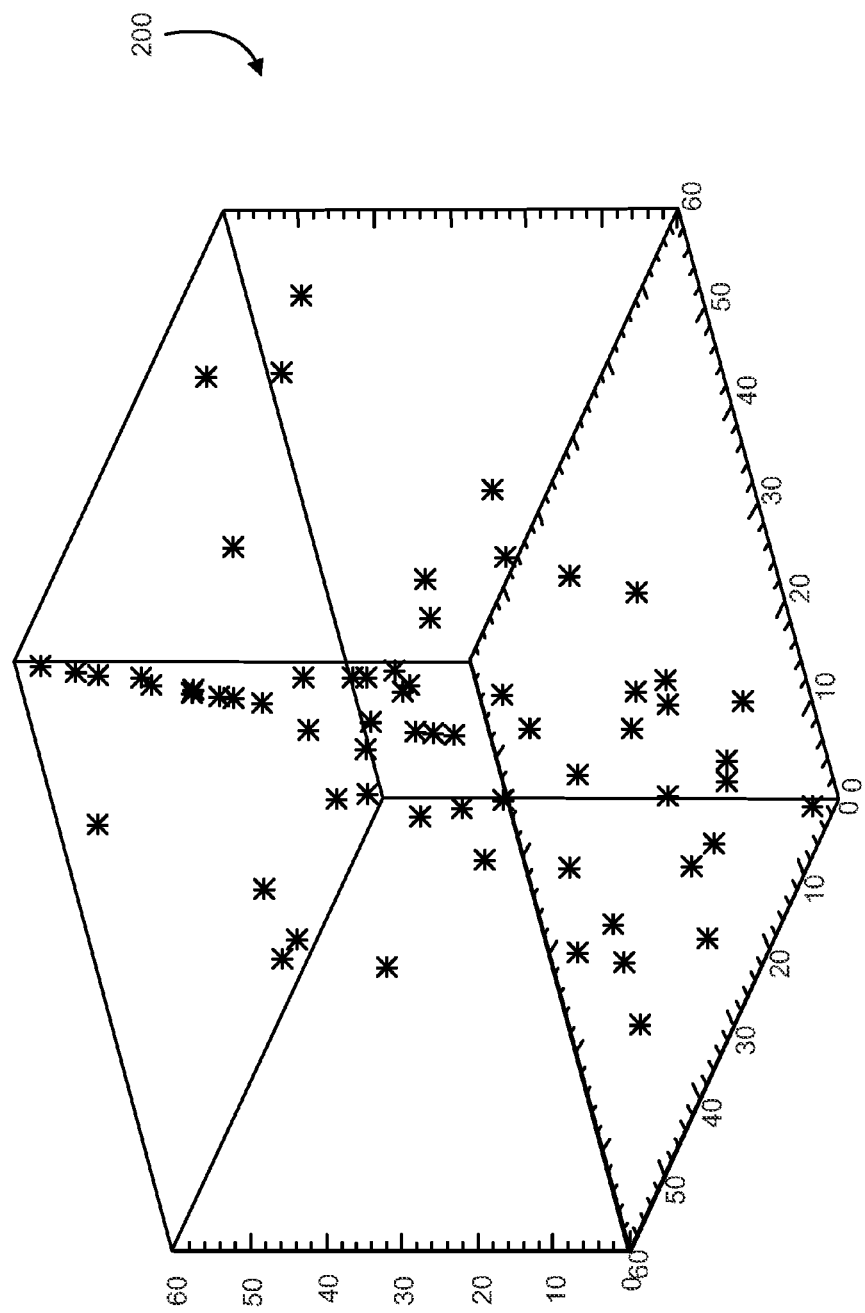
FIG. 2 shows an illustrative example of a distribution of configurations in accordance with at least one embodiment.
Figure 3:
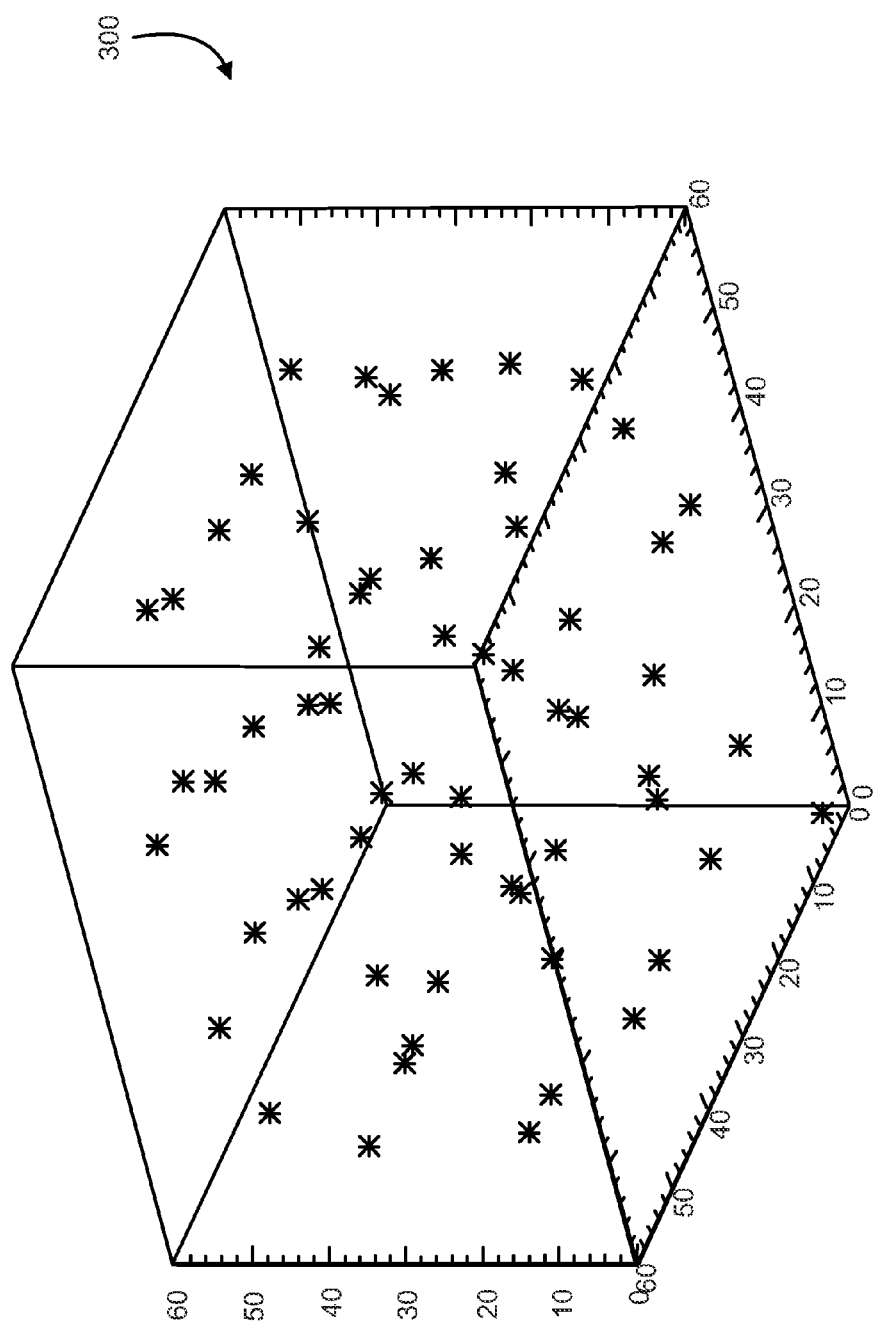
FIG. 3 shows another illustrative example of a distribution of configurations in accordance with at least one embodiment.

Selecting the best small subset of valid configurations for simulating the application is generally a non-trivial task. It is desirable to select a subset of possible configurations that, when tested, will provide a representative set of performance data for the application. A DoE, in an embodiment, begins with a definition of an experimental domain that defines the space in which experiments will be performed. The experimental domain may be, for example, a set of all possible configurations for an application. DoE techniques may then be used to attempt to find a subset of experiments (aka points) that are distributed optimally throughout this space. FIGS. 2 and 3 respectively show two distributions of points in a three-dimensional space, with the points in FIG. 3 being distributed better than the points shown in FIG. 2. Since the performance characteristics of what is being modeled are completely unknown, having an evenly distributed set of points is more likely to result in better data samples, and therefore, in a better model. Hence, given a configuration variable domain and a desired number of representative runs, the configuration selector 102, in an embodiment, uses DOE to find a quality set of valid configurations to feed the application simulator 104.

Enterprise and other applications can have many tunable parameters; furthermore, an enterprise application's tunable parameter values may be constrained by the values of other parameters. It follows that there can be many constraints between parameters. In an embodiment, the system 100 allows a user to specify at least some tunable parameters of an application by defining a variable domain. However, in many instances, it is unreasonable to have the user specify every constraint. Not only are there potentially a great many, these constraints are frequently unspecified and therefore unknown to users. Accordingly, in an embodiment, the configuration selector 102 is configured with the functionality to learn the variable constraints, as described below.

Figure 4:
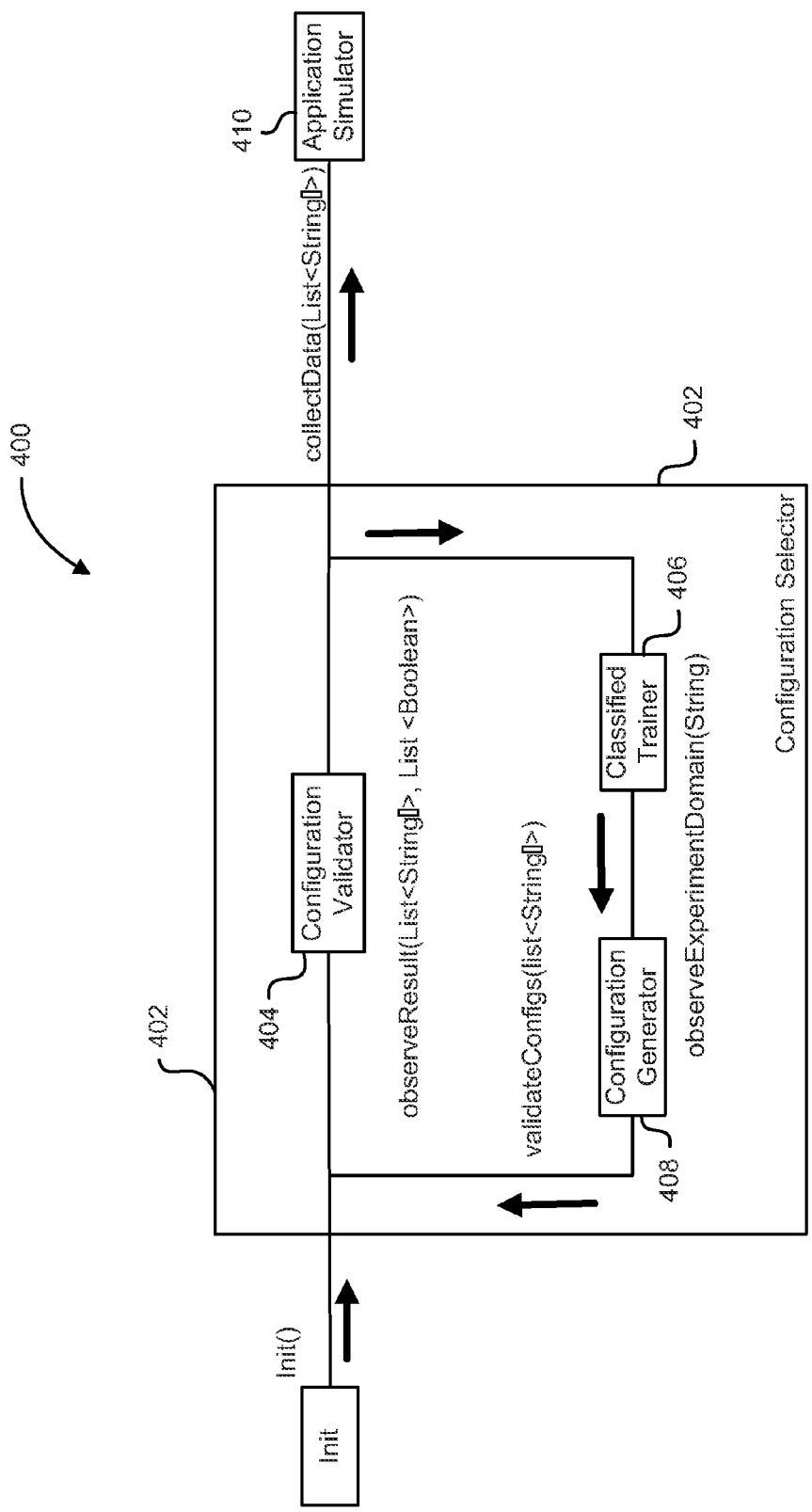
FIG. 4 shows an illustrative example of a configuration selector, which may be the configuration selector of FIG. 1, and its components in accordance with at least one embodiment.

In an embodiment, a configuration selector 102 using a process 400 for selecting configurations is shown in FIG. 4. Some or all of the process 400 (or any other processes described herein, or variations and/or combinations thereof) may be performed under the con) of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In an embodiment, a configuration selector 402, such as in FIG. 1, comprises three components utilized in the process 400: a configuration validator 404, a classifier trainer 406, and a configuration generator 408. As with the system 100 described above, each of the components may be modules configured to perform various functions described herein. In an embodiment, the configuration validator 404 is configured to determine whether one or more configurations are valid. The configuration validator 404 may be application-dependent. Valid configurations may be passed to an application simulator 410, which may be an application simulator pictured in FIG. 1. The configuration validator 404 may check whether there are enough valid configurations before the configurations are passed on to the application simulator.

In an embodiment, if there are not enough valid configurations, then the classifier trainer 406 may be given the list of configurations along with a list of Boolean values that each indicate whether a corresponding configuration is valid. The classifier trainer 406 may take the data from the configuration validator and use that data to train a classifier. The classifier may be a module that, when trained, encodes the learned variable constraints which may then be passed to the configuration generator 408. In an embodiment, the classifier trainer 406 trains a multi-layer perceptron (MLP) or other artificial neural network (ANN), although many different types of classifiers can be used. Generally, the classifier may be any component that is configured to generate a model based at least in part on analysis of data.

The configuration generator 408 subcomponent, in an embodiment, generates a list of configurations which are valid with respect to the constraints encoded in the experimental domain and the learned constraints obtained from the classifier trainer. In an embodiment, the generated list of configurations is passed on to the configuration validator 404 and the process is repeated until one or more conditions on the list of configurations are satisfied. The conditions may, for example, relate to the number of configurations and/or their distribution. For example, the process illustrated in FIG. 4 may repeat until a threshold number of configurations is achieved. The configuration generator 408 may generate configurations in a manner that achieves even distributions.

In an embodiment, the DoE techniques used by the configuration generator are independent from an underlying mathematical model of an application for which configurations are being generated. In an embodiment, the configuration generator 408 generates points utilizing a permutation particle swarm optimization (PSO) to determine an optimal Latin hypercube (OLH) DoE, as described in more detail below. In an embodiment, the permutation particle swarm optimization algorithm is to find solutions for the OLH DoE and to be compatible with the variable constraint learning that occurs in the system 400.

The application simulator 410, in an embodiment, simulates an application under various configurations and usage patterns while collecting performance data from these simulations. Since many simulations are being performed, in an embodiment, the simulations are short, representative runs of the application, although longer runs may be used when time and/or resources permit. The application simulator may utilize various available tools to record performance data from the simulated applications. For example, Enterprise Manager from Oracle International Corporation may be used to write performance metrics into a database at regular intervals. Thus, performance data can be collected from Enterprise Manager (EM) and passed on to the model creator component. As another example, Oracle Application Testing Software (OATS) from Oracle International Corporation is a load-testing tool that can be used to run the application, simulate a configurable number of clients, and collect performance data from the simulations. Generally, the application simulator 410 may use any suitable tool for testing and measuring performance of applications and the application simulator my be programmed itself to perform such tasks.

Returning to FIG. 1, using the performance data gathered from the application simulator 104 component, the model creator 106, in an embodiment, creates a statistical model that predicts the application's performance for a given configuration and workload. A model may be a function that accepts configurations as input and outputs one or more performance characteristics of an application. A model may, for example, accept a configuration as input and output an estimate whether the application will start under the configuration. However, a model may be configured to have more complex outputs. For example, a model may output multiple values, each representing a different characteristic of an application's performance. In an embodiment, the model creator 106 creates the model using supervised learning with the application's configurations and workload as the model's input, and the performance data as sample output. There are many different methods and algorithms available for creating a statistical model of the application. In an embodiment, the performance characteristics are modeled by an MI-P. Feed-forward ANNs, such as MLPs, are useful for many applications since the have a single hidden layer and have been theoretically shown to be able to approximate any continuous function on an interval. While other machine learning techniques may be used and while other machine learning techniques may be more efficient, ANNs are versatile and capable of modeling complex multivariate functions and, therefore, are suitable for a wide range of applications.

Figure 5:
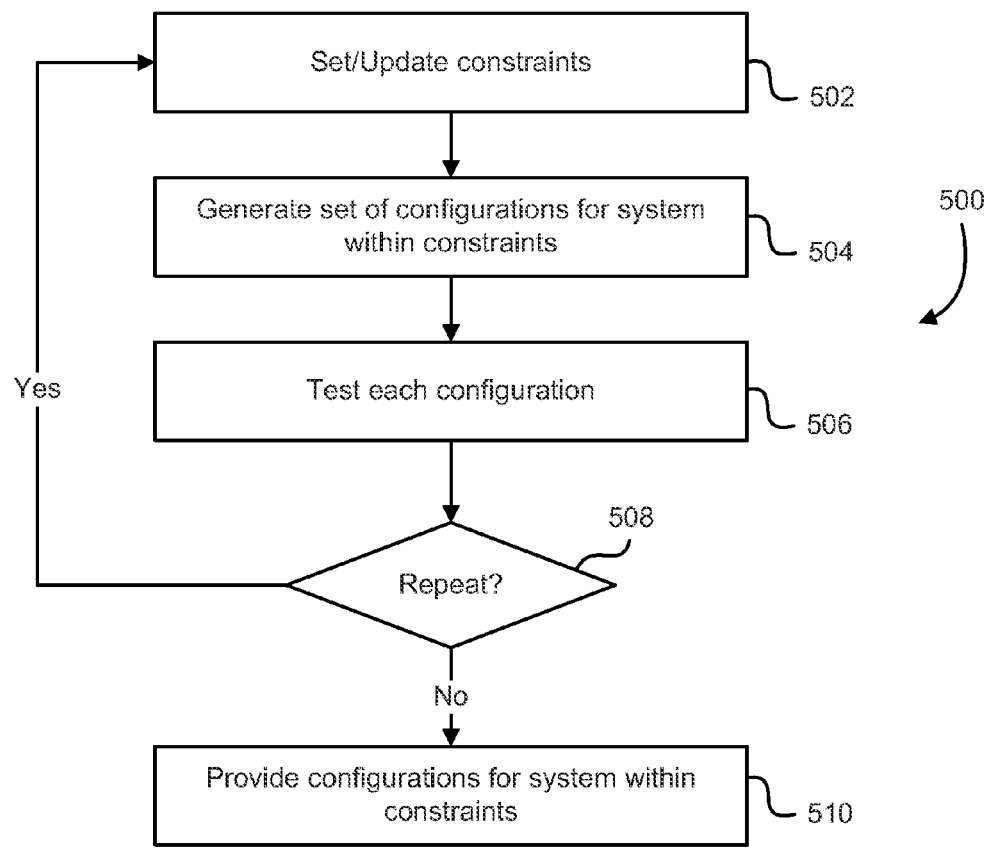
FIG. 5 shows an illustrative example of a process for determining a set of configurations in accordance with at least one embodiment.

FIG. 5 shows an illustrative example of a process 500 that may be used to generate configurations. The process 500 may be used, for example, by a configuration selector to select configurations to test a system, which may be one or more applications and/or one or more applications executing on one or more particular hosts. Some or all of the process 500 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In an embodiment, the process 500 includes setting 502 an initial set of constraints. A constraint, in an embodiment, is a limit for a configurable parameter of an application. The limits may be actual limits. For example, if a certain value of an application parameter has a limited range of possible values, a constraint for the value may be a maximum or minimum value that the parameter may take. The limits may also be limits that are not actual limits. For instance, if a parameter may be set to zero, the constraint may be set to a value that is greater than zero.

Once the constraints are set 502, in an embodiment, a set of configurations for the system is generated 504. Generating the configurations may be done in various ways. In an embodiment, OLH DoE techniques are used to generate configurations within the constraints. Use of OLH DoE techniques allows for generation of a set of configurations with minimal size, which may be particularly useful when resources for testing configurations are limited. However, other techniques for generating configurations may be used. For example, a set of random configurations that are within the constraints may be generated. As yet another example, a configuration space may be partitioned and one or more configurations may be selected from each of the partitions in order to generate a set of configurations that is spatially distributed.

In an embodiment, when the configurations have been generated 504, the configurations are tested 506. Testing the configurations may be completed, for instance, operating (or attempting to operate) the system under each configuration. For example, if the system is a Java Virtual Machine (JVM) testing a configuration may include attempting to start the JVM under configuration. The configuration may be a set of configurable parameters for the NM. Example parameters are maximum heap size, minimum heap size, garbage collector type, parameters for a garbage collector type being tested, and the like. If the JVM starts, the configuration may be identified as valid. If the JVM does not start under the configuration, the configuration may be identified as invalid and subsequently disregarded.

In an embodiment, a determination is made 508 whether to update constraints and generate an updated set of configurations. The determination may be made in any suitable manner. For example, the determination may be made based at least in part on the number of configurations determined to be valid, characteristics of how configurations determined to be valid are distributed, and other considerations. In an embodiment, if it is determined not to update the constraints and generate an updated set of configurations, configurations determined to be valid are provided, such as to test the system under the configurations. If however, it is determined to update the constraints and generate an updated set of configurations, the constraints may be updated 502 and a new set of configurations within the updated constraints may be generated 504 and tested 506, such as described above. As noted, various machine learning techniques may be used to update constraints. For example, machine learning techniques may be used to identify constraints and/or ranges of constraints that are invalid. Further, the techniques may identify subsets of constraints that are not valid. As an example, the value of one application parameter may affect possible values for another parameter. In this manner, the machine learning techniques may be used to efficiently update constraints to avoid testing configurations that are likely to be invalid. In this manner, a set of configurations may be obtained efficiently without users having to know the constraints for a system.

Figure 6:
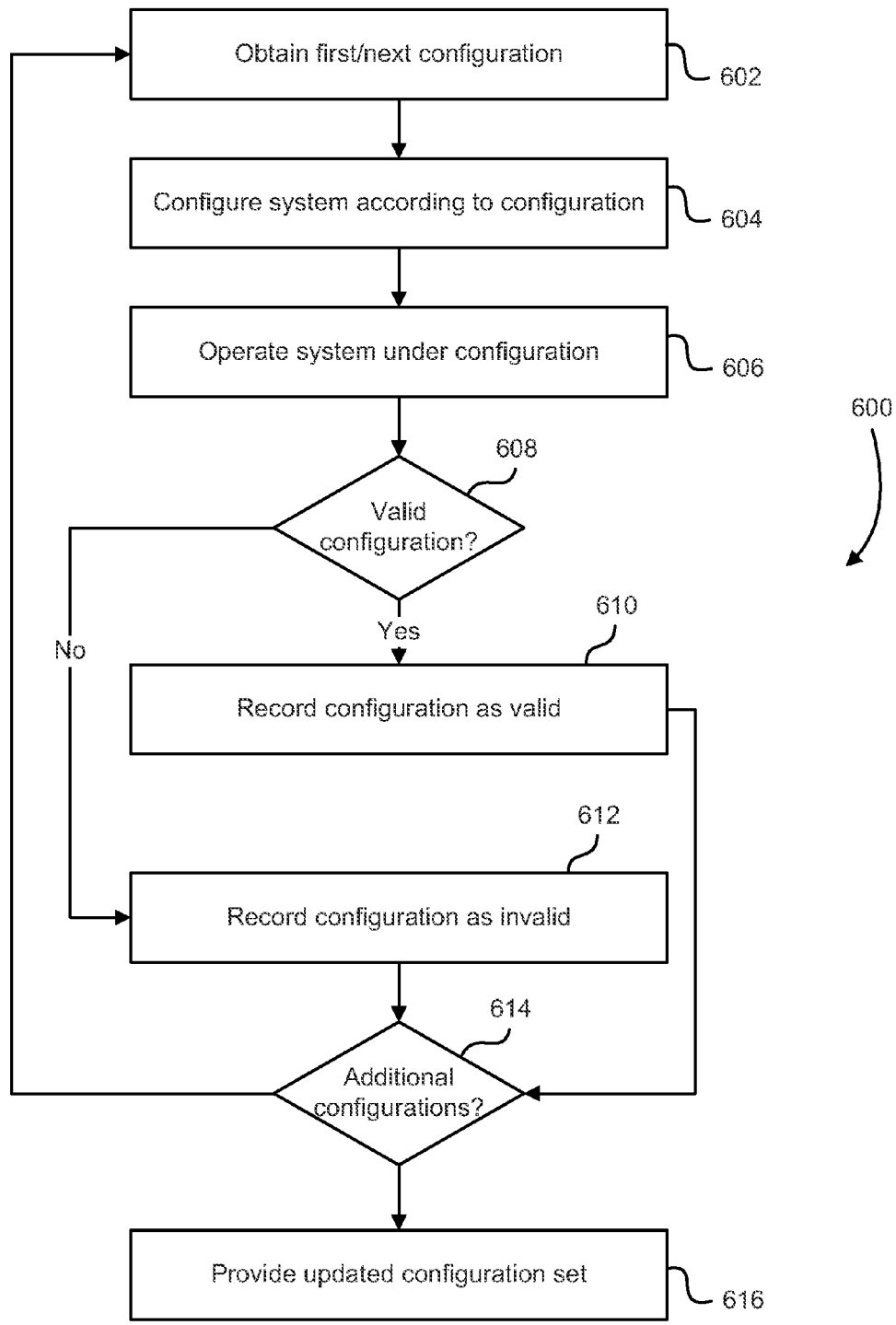
FIG. 6 shows an illustrative example of a process for configuration testing that may be used in the process illustrated in FIG. 5, in accordance with at least one embodiment.

FIG. 6 shows an illustrative example of a process 600 that may be used to test a set of configurations for a system, such as during performance of the process 500 described above. In an embodiment, the process 600 proceeds by systematically testing each of a set of configurations. In an embodiment, a first configuration is obtained 602. Obtaining the first configuration may be performed in any suitable manner, such as by obtaining the configuration from memory of a computer system being used to perform the process 600. In an embodiment, a system is configured 604 according to the obtained configuration and operated 606 under the configuration. As noted above, configuring and executing the system may be performed in various ways and, generally, the manner in which a system is configured and operated may depend on the system itself. For instance, configuring and executing a JVM may include attempting to start the JVM under a particular configuration.

In an embodiment, a determination is made 608 whether the configuration under which the system was tested is a valid configuration. If it is determined 608 that the configuration is a valid configuration, the configuration is recorded 610 as valid. If it is determined 608 that the configuration is not valid, the configuration may be recorded 612 as invalid. In an embodiment, once the validity of the configuration has been recorded, a determination is made 614 whether there are additional configurations to test. If there are additional configurations, the next configuration may be obtained 602 and used to test the system, as described above. This process may continue until a determination is made 614 that there are no additional configurations to test. At this point, the process 600 may include providing 616 an updated set of configurations. The updated set of configurations may be encoded in one or more electronic documents. The updated set of configurations may be used, for example, in a machine learning process in order to learn constraints of the system being tested, as described above.

Returning to FIG. 1, the model optimizer, in an embodiment, takes the model created by the model creator 106 component, and determines one or more configurations that produce optimal performance with respect to one or more user-specified objective functions. Optimal performance may be measured based at least in part on latency, throughput, calculations per time period, and, generally any characteristic of an application. Depending on the type of statistical model of the application's performance characteristics, there are many candidate optimization algorithms that may be used. Example suitable algorithms are PSO and GA (genetic algorithm). PSO and GA algorithms may be used to find an optimal set of inputs regardless of the type of model that is used. In an embodiment, the model optimizer is configured to monitor a running application's performance and compare the monitored performance to the predicted performance of one or more models that have been created in accordance with the various embodiments. If a model is found to be lacking for any reason, the process can be restarted, making the entire process iterative.

As noted, embodiments of the present disclosure may be used in connection with various applications. One example of an application that may be used in accordance with the various embodiments are Governance, Risk, and Compliance Controls (GRCC) applications available from Oracle International Corporation. In particular, the various embodiments described herein may be used to construct a GRCC decision support system (DSS) tool that utilizes a custom connector to extract data from a specified source, such as Enterprise Manager, and uses the data to optimize a performance model of an application. It should be noted that some, but not all components described may be used and that components other than those illustrated may be present. For instance, a DSS tool may be mapped to the model creator and model optimizer components that are described above. Data acquisition from sources such as OATS and EM, and the creation of the performance model may correspond to the model creator.

Using the performance model GRCC DSS tool, in an embodiment, gives users the option of making comparisons between predicted and observed values for an application's performance. For example, a first comparison between the application's observed performance and the application's performance as predicted by the model may be provided to a user. This allows the user to visualize how well the model will be able to predict the application's performance, assuming the application's behavior does not change. A next comparison may display the application's observed performance versus the predicted optimal performance. Such visualizations help users determine if a model needs to be retrained or if the application might need to be reconfigured.

Figure 7:
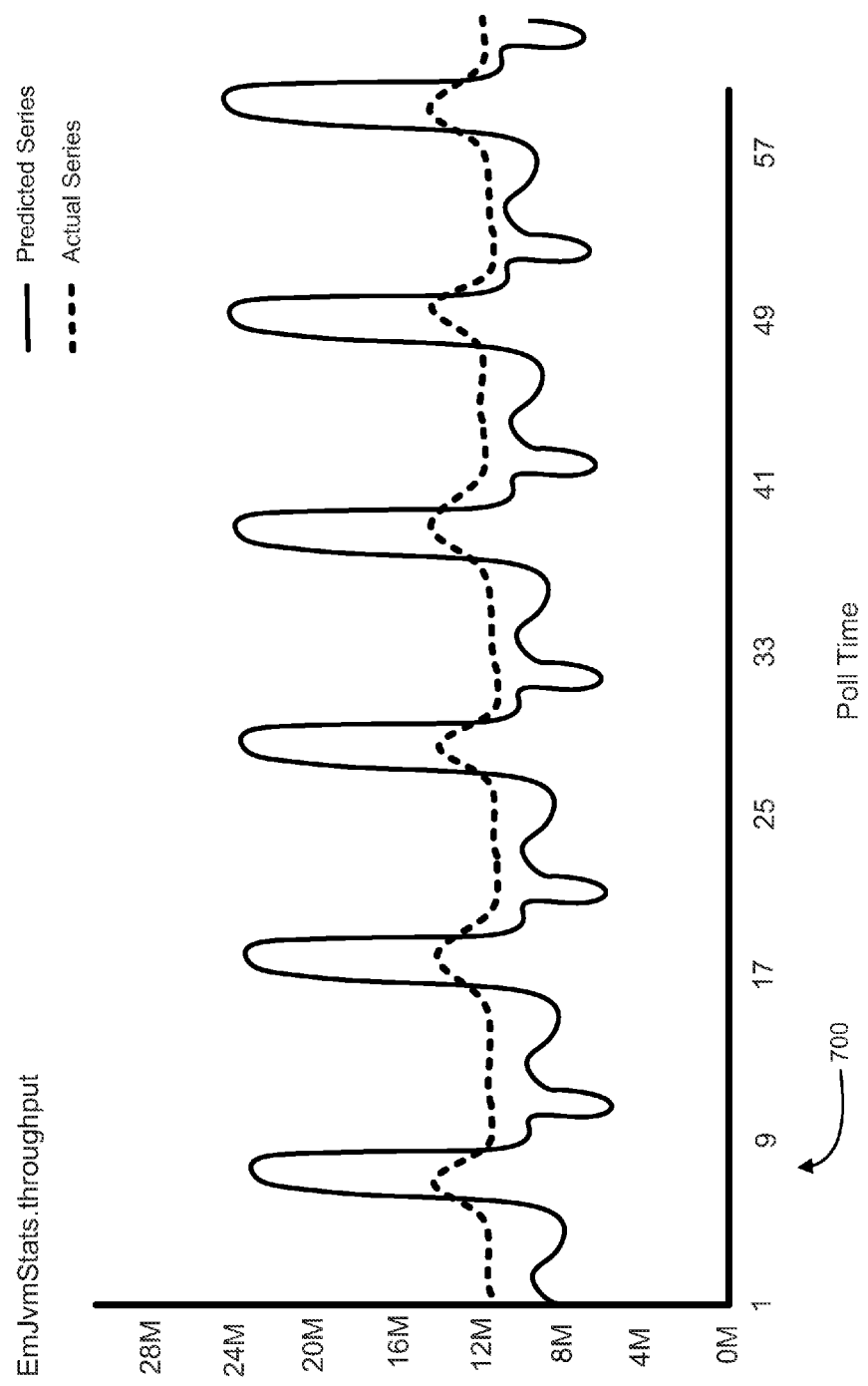
FIG. 7 shows an illustrative example of a display created in accordance with at least one embodiment.

FIG. 7 shows an illustrative example of a display that may be provided to a user using such a tool. The display in FIG. 7, in this example, shows a graph 700 generated by an example GRCC DSS tool that plots predicted throughput and actual throughput. From the graph 700, one can see that while the contour of the predicted and the actual throughput are similar, the actual throughput varies much more in magnitude. Thus, with the functionality described above, a model optimizer component allows users to optimize performance for a set of constraints. For example, given a workload and desired performance characteristic, a model optimizer can be used to search for an application configuration that has predicted performance that most closely matches the desired performance, in other words, users can ask questions like "What is the configuration that maximizes throughput for workload x, while keeping average latency<300 ms?" A user can use these results to decide under what configuration the application should operate.

Figure 8A:
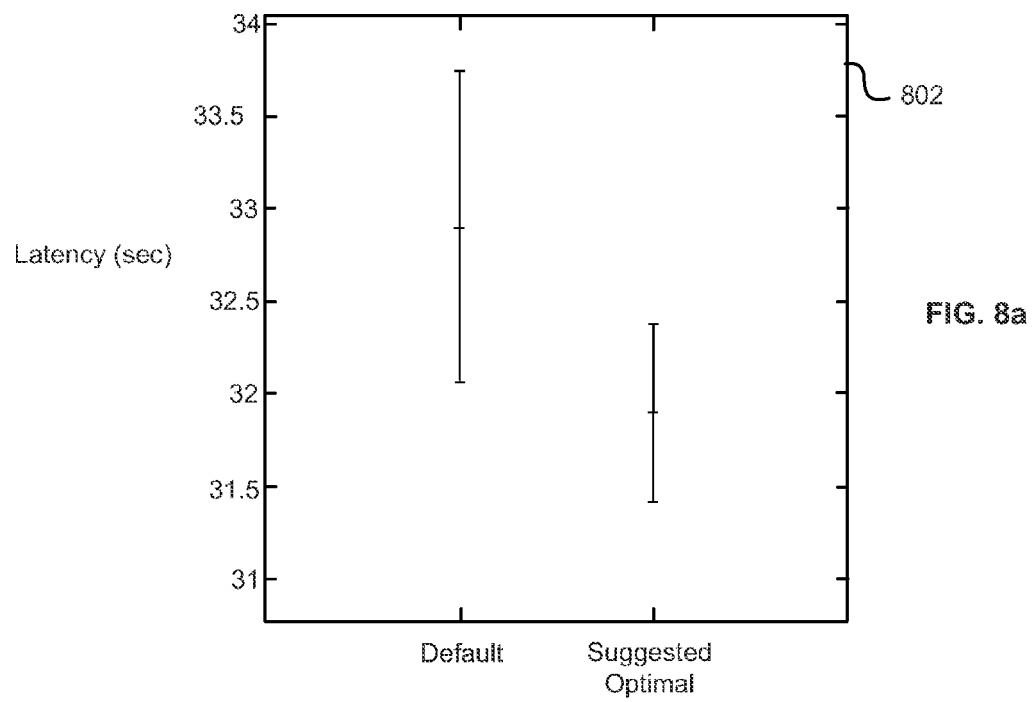
FIGS. 8a and 8b show illustrative examples of displays created in accordance with at least one embodiment.
Figure 8B:
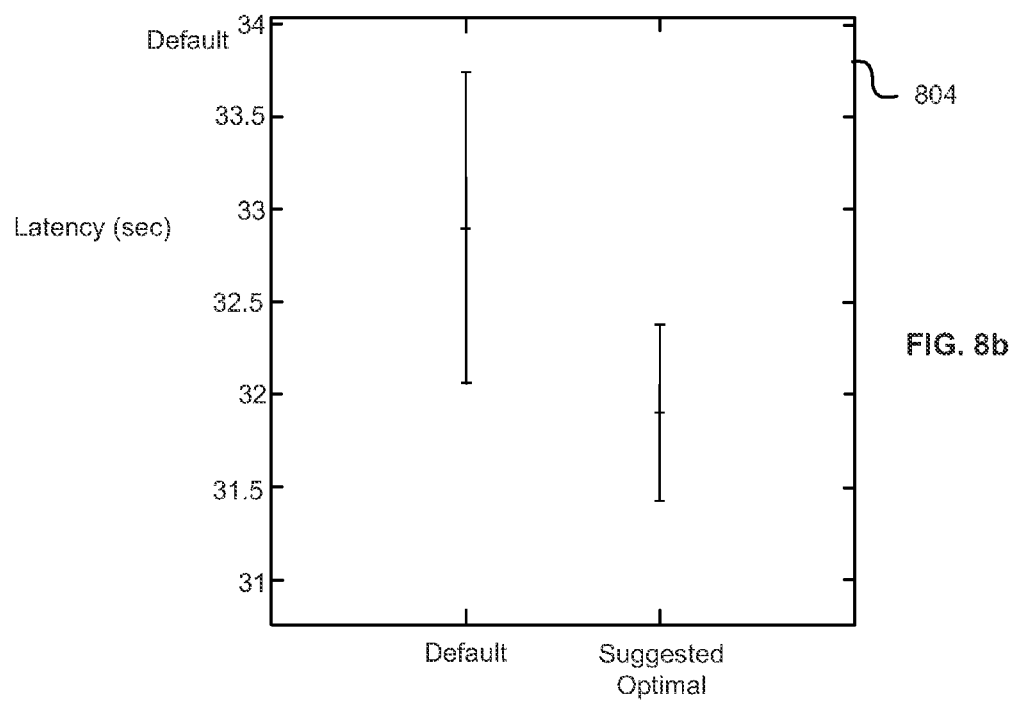

FIGS. 8a and 8b illustrate another illustrative example of displays 802, 804 that may be provided to a user utilizing various embodiments of the present disclosure. The displays illustrated in FIGS. 8a and 8b, in this example, were created by utilizing OATS to create virtual users, having those virtual users use Enterprise Governance Risk and Compliance Manager (EGRCM) available from Oracle International Corporation, and keeping track of various performance metrics including average latency and throughput. To do this, a system, such as described above, was adapted for tuning EGRCM. Tuning EGRCM involved tuning a combination of ten JVM and application specific parameters. EGRCM was set up to run on a dedicated server, and the system ran on a different machine with an OATS installation.

In this example, the system selected 60 valid EGRCM configurations, and used OATS to simulate each of the 60 configurations six times for a total of 360 configurations. Since the parameters that were being tuned had to be set before startup, the EGRCM server had to be started up before and shut down after every OATS simulation. Web Logic Scripting Tool (WLST) was used to set the configurations, and start and stop EGRCM. The OATS simulation itself consisted of creating one-hundred virtual users, and having each of those virtual users log in to EGRCM, navigate through a couple of pages, and perform a search. Each user performed this sequence of actions five times. A model was trained using the performance data obtained from OATS. The performance data averaged server latency, measured in seconds, and throughput, measured in transaction per second, although, as noted above, performance measures could be any measure of a system's performance.

The configuration suggested by the Model Optimizer component was not one of the configurations that was simulated. As a result, the suggested configuration that was simulated was the configuration that was suggested by a model optimizer component for comparison to the default configuration (with no flags set). The results are shown in FIGS. 8a and 8b. FIGS. 8a and 8b demonstrate the improvement the suggested configuration has over the default configuration both in average latency and in throughput. While there is some overlap in the data, there is a marked improvement in the suggested configuration, as illustrated in the figures.

Figure 9:
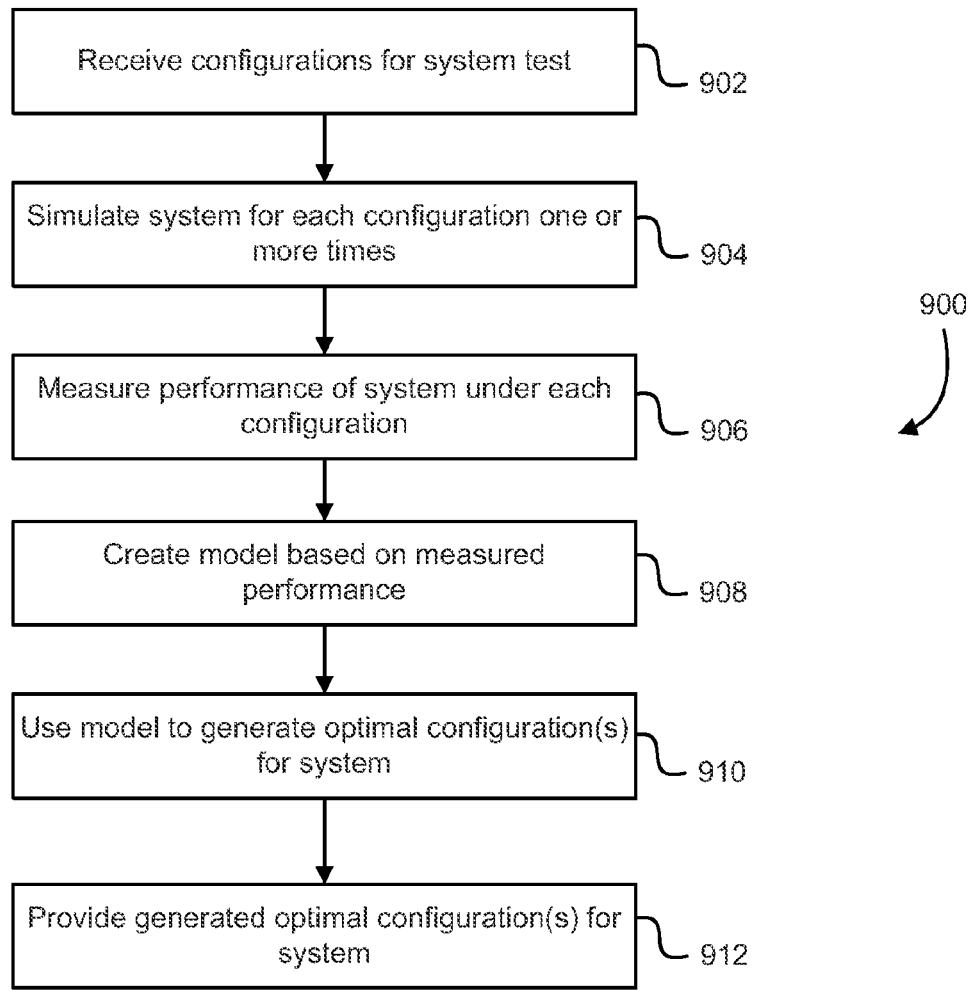
FIG. 9 shows an illustrative example of a process for determining optimal configurations for a system in accordance with at least one embodiment.

FIG. 9 shows an illustrative example of a process 900 for determining an optimal configuration in accordance with an embodiment. The process 900 illustrated in FIG. 9 may be used to provide one or more configurations that may be used to tune a system. The configurations may be provided to one or more users to enable the users to tune the system themselves, may be provided to the system itself to enable the system to tune itself, and/or may be provided to another system that is operable to tune the system for which the one or more configurations were determined.

In an embodiment, the process 900 includes receiving 902 configurations for a system test. The configurations may have been generated in accordance with the above description or, generally, in any suitable manner. The received configurations, for example, may be a set of configurations that fits within a space of possible constraints that were learned in accordance with the above description. The received configurations may be used to simulate 904 the system under each of the configurations. Simulating the system may be performed in any suitable manner, and the manner in which the system is simulated may depend on specifics of the system itself. For example, as described above, a system may be simulated by creating virtual users for the system and causing the virtual users to interact with the system. One or more scripts may be utilized to create the users and/or to cause the users to interact with the system. The script may, for example, utilize an application programming interface (API) of an application of the system to make API calls to the system on behalf of the virtual users. Generally, simulating the system may involve any type of operation of the system under any type of load.

In an embodiment, when the system is simulated 904, the performance of the system is measured 906. As discussed, measuring the system's performance while it is being simulated may include measuring one or more performance characteristics of the system. Performance characteristics may include latency, throughput, memory usage, processor usage, and, generally, any characteristic of the system's performance. Because of the complexity of systems being tested, simulating the system and measuring the system's performance may be performed several times to improve the accuracy of the measurements. In an embodiment, the system is simulated between six and ten times for each configuration, although the system may be simulated a different number of times, which may depend on the cost and resources available for simulating the system. When the system is simulated multiple times, measuring the performance of the system may include calculating statistical measurements of the system's performance, such as average values, median values, standard deviations, variances, and the like.

Once the performance of the system has been simulated and performance has been measured for the various configurations, in an embodiment, the results are used to create 908 a model of the system, where the model may be a function that takes a configuration as input and provides one or more values as output. The one or more output values may be estimates of system performance under an input configuration. Once a model has been generated, in an embodiment, the model may be used to generate one or more optimal configurations for a system. Generating an optimal configuration for a system may include determining one or more configurations that, when input into the model, result in a maximum, minimum, or other desirable value for some performance characteristic that the model represents. For example, the model may be used to find a configuration that results in minimum latency.

In addition, a model may be used to determine an optimal configuration for multiple outputs. As an example, a model may be used to determine a configuration that simultaneously optimizes both latency and throughput. To do this, a function that takes latency and throughput as values and outputs another value may be determined. The model that outputs both latency and throughput values may be used to find a maximum or minimum value of the function, depending on how the function is configured. Further, determining the optimal set of configurations may include setting one or more values of a configuration and determining the other values. A user, for instance, may specify an anticipated average workload on the system of a particular garbage collector, and, generally, any other parameters that, while configurable, a user prefers to have set in a particular way. In some embodiments, a user is able to specify multiple workloads and determining an optimal set of configurations may include determining configurations that are acceptable for some workloads while optimized for others. As one example, a user may expect a light workload on a system for normal operation and a high workload on the system at other times, such as at month end, quarter end, fiscal year end, and the like. The user may only require some minimal performance from the system during normal operation because of the light workload, but may require high throughput during the high-workload times. Accordingly, a model may be used to find one or more configurations that satisfy both the minimal condition at low workloads while being optimal at high workloads. In other words, users may be able to provide one or more conditions on a model's inputs and one or more conditions on a model's outputs and one or more configurations may be determined that both satisfy the conditions and optimize one or more outputs. Locating the optimal configuration may be accomplished by performing a heuristic search for an optimal configuration from a set of possible configurations and/or using other techniques.

In an embodiment, once the optimal configuration(s) are determined, the one or more optimal configurations may be provided 912. As noted above, providing the one or more optimal configurations may be performed in any suitable manner, such as any manner that enables tuning of the system accordingly.

As with any process described and suggested herein, variations are considered as being within the scope of the present disclosure. For example, the process 900 may also include checking whether a configuration determined as optimal is valid. A system performing the process 900 may, for instance, test configuration validity before providing any configurations. The system performing the process may, for example, determine whether a configuration falls within constraints that have been learned, as described above, or constraints of which there is prior knowledge. The system may actually test the configuration, such as described above. If a configuration is determined to be invalid, another configuration may be determined in its place. This process may continue until a valid, optimal configuration is determined.

As noted above, various techniques may be used to determine a set of configurations for testing a system. As discussed, a configuration may be a set of values that may be set for a system (e.g., application). Further, because limited budgets and resources limit the number of configurations that can be tested, it is often desirable to determine a set of configurations for testing that is well distributed. In an embodiment, an Audze-Eglais Latin hypercube optimization process is used, as described more completely below.

In an embodiment, an optimal Latin hypercube DoE is determined for p and v, where p represents a number of experiments within an experimental domain, where an experimental domain (often called a design space) is defined as a domain of v variables. The value for p may be set, for example, based on the number of experiments budget and resources allow for. A Latin hypercube is an extension of a Latin square, where a Latin square is a p×p table filled with p different symbols such that each symbol occurs exactly once in each row and exactly once in each column. (Sudoku puzzles are Latin squares with an additional constraint.) A Latin hypercube, being an extension of a Latin square into more than 2 dimensions, i.e. the v variables in our domain, therefore is a hypercube of v dimensions, each having a cardinality of p (since there are p "symbols"). A Latin hypercube DoE is an arbitrary set of p points, where each point is represented by v-tuple. Furthermore, each point is within the bounds of an experimental domain of the v variables where, as noted, each point represents an experiment.

To spend our budget wisely (i.e. to test a system in a manner that is most likely to allow for determination of an optimal configuration given the constraints on the number of tests that can be done), in an embodiment, a search for an Optimal Latin Hypercube (OLH) forum experimental domain of v variables and p points is performed. The OLH, for a given p and v, may be a set of p v-tuples (points) such that the individual points are as evenly distributed as possible throughout the hypercube. As discussed below, DoE processes can use a variety of objective functions to distribute the points throughout an OLH, like maximizing entropy, a maximum of distance between points, minimized integrated mean square error, various heuristic methods, and an Audze-Egiais objective function that is based on potential energy.

The Audze-Eglais objective function, in an embodiment, treats each point as a unit of mass that exerts a repulsive force on its neighbors. The force is inversely proportional to the squared distance between the two points, if the hypercube is thought of as a container that can hold these units, and p units are inserted into the container, the units will repel one another and eventually reach an equilibrium in which the points are all as far apart as possible. This state is the lowest potential energy state. The location of each point in this state, in an embodiment, provides our design of experiments.

The equation used in the Audze-Eglais for p points may be:

$$\min U = \min \sum_{p=1}^{P} \sum_{q=p+1}^{P} \frac{1}{L_{pq}^2}$$

U is the potential energy and $L_{pq}$ is the distance between p and q, where p and q are not the same point.

For a given experimental domain, each possible set of experiments (DoE) can be evaluated using equation above. The DoE that has the minimal value, U, will have the most even distribution of points and is therefore favored.

Figure 10A:
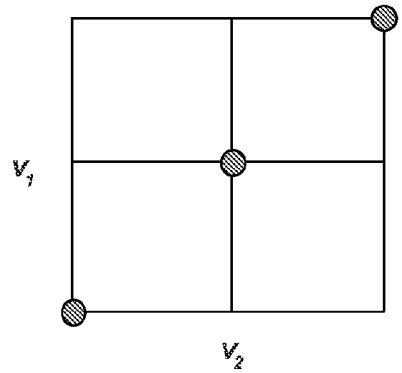
FIG. 10(A) shows an illustrative example of a Latin hypercube, in accordance with at least one embodiment.
Figure 10B:
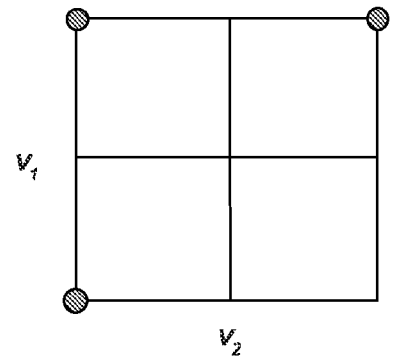
FIG. 10(B) shows another illustrative example of a Latin hypercube, in accordance with at least one embodiment.
Figure 10C:
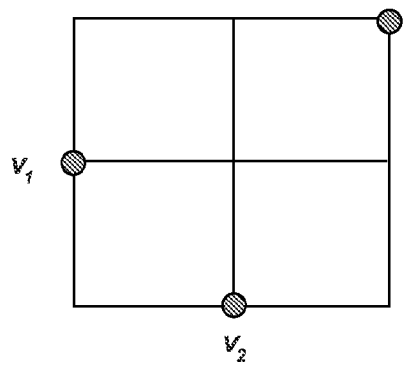
FIG. 10(C) shows another illustrative example of a Latin hypercube, in accordance with at least one embodiment.

FIG. 10 shows an illustrative example of hypercubes (LH) where v is equal to 2 and p is equal to 3. In particular, for v=2 and p=3, a 3×3 square grid with (0,0) at the lower left corner and (2,2) at the upper right corner can be drawn. Placing a point at (x, y) corresponds to assigning $v_1$ the value y and $v_2$ the value x. A valid LH, in this example, consists of a placement of three points such that both coordinates are integer valued, and neither variable is assigned the same value by any two points. For example (0, 0), (1, 0) and (2, 2) yields an invalid LH because v2 is assigned the value 0 by both the first and second point. FIG. 10(A) shows a set of three points that produces a valid LH, but its value of U=1.125 is not minimal. FIG. 10(B) shows a set of 3 points that produces the minimal value of U. However, this is not a valid LH since the two points on the left indicate that variable $v_2$ will be twice assigned the value 0. FIG. 10(C) shows us a set of 3 points that produces an OLE with U=0.9.

As discussed, particle swarm optimization (PSO) algorithms can be used in various embodiments. The PSO algorithm was inspired by biology as the algorithm simulates and interprets the social behavior of groups such as schools of fish and flocks of birds. In PSO, groups are called swarms and individuals are called particles. The PSO algorithm, in an embodiment, proceeds by searching for an optimal solution by generating a set of candidate solutions, called particles, which, taken as a group, comprise a swarm. The algorithm iteratively moves particles through the search space looking for a better solution. The movement of each particle is guided by the best position at which the particle has been (local best position) and the best position at which any particle in the swarm has been (global best position).

In standard formulations of the PSO algorithm, there may be a single swarm and each particle in the swarm has a position x and a velocity v, where both x and v are points in n-dimensional Euclidean space, $R^n$. These points are denoted by $x_t$ and $v_t$, the position and velocity, respectively, at iteration t of the algorithm. Each particle may be initialized with a random position $x_0$ and velocity $v_0$. The algorithm may proceed by iteratively updating each particle's position and velocity until a predefined termination condition has been met. Some examples of termination conditions include, but are not limited to, running the algorithm for a max number of iterations, or not finding a better solution for a given number of iterations.

At each iteration, time is incremented by one step. Therefore, a particle's position is updated by adding its current velocity to the position, so:

$$x_{t+1} = x_t + v_t$$

After a particle's position has been updated, its velocity may be updated in the following manner:

$$v_{t+1} = \alpha v_t + c_1 r_1 (l_t - x_t) + c_2 r_2 (g_t - x_t)$$

where $\alpha$ is the coefficient of inertia, $c_1$ and $c_2$ are in the range (0,1], $r_1$ and $r_2$ are random numbers in [0,1), $l_t$ is the local best position up to iteration t, and $g_t$ is the global best position up to iteration t.

Once a particle has been updated for a given iteration, a check may be performed to see if its new position is now the local best position, and if the new best position is the new global best position. Before iterating again, the algorithm may check to see if any of the termination conditions have been reached, and if so, stops. While few assumptions of the underlying problem are made, the standard PSO algorithm does assume that the solution space is a continuous subset of $R^n$. Despite this limiting assumption, the PSO algorithm may be modified to deal with problems where the solution space contains discrete and/or mixed (both discrete and continuous) values.

The problem of finding the OLH DoE requires finding a set of p points in the v-dimensional lattice of integers modulo p, $Z_p^v$. Not only does the PSO algorithm need to be modified to search $Z_p^v$, but it also has to account for the fact that not every set of p points in $Z_p^v$ is a valid Latin hypercube. In fact, the sets of p points which are valid may satisfy the following condition: given an ordering of the p points, for i ranging from 0 to v−1, the $i^{th}$ coordinates of the p points form a permutation of the integers modulo p. For example, for v=2 and p=3, the points (0,1), (1,0), and (2,2) form a valid LH. The permutation (0 1 2) is obtained by taking the set of the first coordinates of each point, white the permutation (1 0 2) is obtained by taking just the second coordinates. Accordingly, the problem of finding the OLE DoE is equivalent to finding the sequence of v permutations on the integers modulo p that minimizes the Audze-Eglais objective function. To search for the OLH DoE using the PSO algorithm, several modifications may need to be made to allow the algorithm to operate on this space of permutations. Embodiments of this modified version are referred to herein as a permutation PSO, permPSO.

PSO, in an embodiment, works by moving a set of particles by updating each particle's position by adding its position to its velocity. In this algorithm, a particle is represented by an array of v permutations on the integers modulo p. In order for the PSO algorithm to be applicable to this problem, two notions need to be defined for the set of permutations: 1) a metric, and 2) the concept of velocity. With these notions, a particle's velocity and position can be updated one permutation at a time.

Before defining a metric on the set of permutations, a transposition needs to be defined. A transposition is an operation which exchanges two elements and keeps all others fixed. For example, the transposition of 1 and 2 in the permutation (0 1 2) results in the permutation (0 2 1). For any two permutations, there is a minimal number of transpositions that will transform one permutation into the other. This, in an embodiment, serves as our distance metric, although other distance metrics may be used.

The notion of velocity is a bit more complex to define on the set of permutations. For the standard PSO with particles in $R^n$, velocity is defined as the change in position over the change in time. Since the algorithm treats one iteration as a single time unit, the only notion that needs to be defined for the set of permutations is the change in position by a given distance.

Defining direction is difficult for several reasons including the fact that there may be multiple ways to get from one permutation to another. Therefore, the permPSO algorithm, in an embodiment, replaces the notion of velocity from the PSO algorithm with the notion of moving toward another position. Since there is no notion of direction, we simply keep a transposition vector for each particle, denoted by s, by virtue of being somewhat analogous to "speed". The $i^{th}$ component of the transposition vector denotes the number of transpositions that are applied to the $i^{th}$ permutation. The greater the "speed", the more transpositions.

For each iteration of the permPSO algorithm, and for each particle, the particle's transposition vector is updated, then the position is updated, and lastly, a check for updates to the best local and global positions is made. The update of the $i^{th}$ component of the transposition vector at iteration t is given as follows:

$$s_t^i = \text{Round}(d^i s_{t-1}^i + c^i r_i d(b_t^i, x_t^i))$$

where $d^i$ is the coefficient of drag in (0, 1), $c^i$ is the update coefficient in (0, 1], $r_i$ is a randomly generated number in the range [0,1), $s_t^i$ and $s_{t-1}^i$ are the "speeds" at iterations t and t−1, respectively, $b_t^i$ and is the $i^{th}$ permutation of the best position at iteration t. Whether it is the global best or the local best is decided randomly for each particle at each iteration. Note that since $s_t^i$ denotes the number of transpositions applied to the $i^{th}$ permutation, $s_t^i$ must be an integer, and the sum on the right-hand side of the above equation is therefore rounded to the nearest integer value in this example. The position is then, in an embodiment, updated by moving the $i^{th}$ permutation by $s^i$ transpositions towards $b_t^i$. If $s^i$ greater than the distance to $b_t^i$, then random transpositions may be applied, up to a total of $s^i$. In an embodiment, all $d^i$ and $c^i$ may be set to 0.6 and 0.5, respectively.

Various systems may be utilized to implement the above algorithms. In an embodiment, the above algorithms are implemented using the Java programming language. The permGA algorithm, for example, may be implemented using a Watchmaker Framework for Evolutionary Computation. PermGA may be implemented using simple crossover instead of the inversion crossover, and changing the elitist size, for example, to 20%. FIG. 11 shows a table of results for an experiment that was performed comparing the above-described techniques. In particular, the population size for the permGA was set to 100 for the 2×120 and the 3×120, and 200 for the remaining problems. The permPSO algorithm that was used is much slower; so the number of particles in the swami for each problem was half of the population for the permGA.

As illustrated in FIG. 11, the results indicate that permPSO is a suitable alternative to the permGA algorithm in terms of finding a solution that minimizes the Audze-Elais potential. Even though the two algorithms produce similar quality solutions, the algorithms behave differently for different problem sizes. The permPSO algorithm was noted to tend to find a solution of fitness that is comparable to the best permGA solution in a number of fitness function evaluations that is one order of magnitude less, hut the larger the p value, the longer each iteration takes.

In an embodiment, when formulating an OLH DoE, every set of values that can be assigned to a variable is finite and discrete, and the values are required to be equally spaced. This means that in the definition of the experiment domain, variables that take on real number values must have the set of possible values restricted by only selecting numbers that are a fixed interval apart and belong to abounded subset of the real numbers. Also, as formulated, the OLH DoE problem requires selecting p experiments, and each variable to have a cardinality of p, but this may be too limiting. It is unlikely that every parameter will have the same number of values, and that the number of values is equal to the number of experiments desired. For these reasons, the generalized OLH DoE, in an embodiment, allows each variable to have its own cardinality, while p still denotes the number of experiments. To minimize the number of repeated values for each variable, the restriction that the number of repeated values does not exceed the ceil($c_i/p$), where ceil(x) is the ceiling function mapping a real number x to the smallest integer greater than or equal to x, may be imposed. For example, if variable i has cardinality 3 and p=5, then the number of repeated values for variable i cannot exceed ceil(3/5)=2. Thus, (0 0 1 2 2) is a valid permutation of values, while (0 1 2 2 2) is not since there are three values of 2.

Since the generalized OLH DoE allows for values to be repeated in a permutation, and since the values are not repeated the same number of times if $c_i/p$ is not an integer, the permPSO algorithm has to consider different sets of values in addition to permutations of these values. To do so, the definition of distance needs to be redefined. Before doing so, a valid value replacement needs to be defined. A value replacement is the action of replacing a value in the set of values being permuted with another value. A value replacement is valid when the resulting set of values does not repeat any value more than ceil($c_i/p$) times. Again, suppose variable i has cardinality 3 and p=5; then replacing 0 with 1 in the permutation (0 0 1 2 2) results in (0 1 1 2 2). This is a valid value replacement since no value is repeated more than twice. Now, for two permutations $\sigma_1$ and $\sigma_2$, $d(\sigma_1, \sigma_2)$ is the minimal number of valid value replacements and transpositions required to transform $\sigma_1$ into $\sigma_2$.

For a given software system, it may be the case that variables are not independent. For instance, the values that can be assigned to a variable may be constrained by the value assigned to another. For example, one parameter, m, may specify the minimum size of some resource and another parameter, M, its maximum size. These two parameters would not be independent since a value assigned to one constrains the value assigned to the other. In other words, in some instances the value of m must be greater than (or equal to) the value M. The OLH DoE methodology generally does not account for such constraints, and in order for the OLH DoE methodology to not have to account for variable constraints, in an embodiment, the experiment domain is transformed.

The experiment domain may be transformed by grouping dependent variables together. That is, variables that constrain each other are grouped into the same set. These sets of variables, in an embodiment, are replaced by a single variable in the transformed domain. This single variable enumerates all the valid combinations of values for the variables associated with this new variable. Each value for the new variable maps to a valid assignment of the variables in the original experiment domain. Variables that do not constrain and are not constrained by any variables are left unchanged in the transformed domain. For example, suppose we have three variables $v_1$, $v_2$, and $v_3$. Variable $v_1$ can take on a value from {1, 2, 3}, $v_2$ a value from {2, 4}, and $v_3$ a value from {0, 1}. Also, suppose that $v_1$ must be strictly less than the value of $v_2$. Then in the transformed domain, variables $v_1$ and $v_2$ map to a single variable, $u_1$, and $v_3$ maps to the variable $u_2$ which is identical to $v_3$ since the value assigned to $v_3$ does not constrain $v_1$ or v2. Variable u1 in the transformed domain has a set of four values, each one mapping to one of the following four assignments $v_1$ and $v_2$: (1, 2), (1, 4), (2, 4), (3, 4), where the first value is the assignment for $v_1$ and the second for $v_2$.

While this mapping, in an embodiment, guarantees that every LH is a valid assignment, it may not be an isometry (distance-preserving map). Since the Audze-Eglais objective function is based on distance, this may be an issue which may be addressed by abstracting into the permPSO algorithm's fitness function, where a particle's position is transformed back into a position in the original experiment domain before passing it to the Audze-Eglais objective function.

For experiment domains with many variables, there may be many complex constraints, making it unreasonable to describe and manually encode these constraints. Thus, in an embodiment, an algorithm that can learn inter-variable constraints by training a classifier with a set of valid/invalid variable assignments is used. A trained classifier, such as described above, may encode the inter-variable constraints that determine whether a configuration is valid or not. In an embodiment, the constraints are extracted from the classifier and used to create a transformed experiment domain of the type described above. For many classifiers, such as Artificial Neural Networks (ANN), extracting learned constrains is far from trivial; thus an alternative method of incorporating these learned constraints into the permPSO algorithm may be used. As with the issue with the experiment domain mapping not being an isometry that was abstracted into the permPSO fitness function, the issue of not being able to extract the learned constraints from a classifier can also be abstracted away into the permPSO fitness function. In this case, it may be done by actually passing the trained classifier into the fitness function, and giving experiments containing invalid value assignments a highly unfavorable fitness value. While not as effective in all instances, this may lead the algorithm away from experiments containing invalid value assignments.

Figure 12:
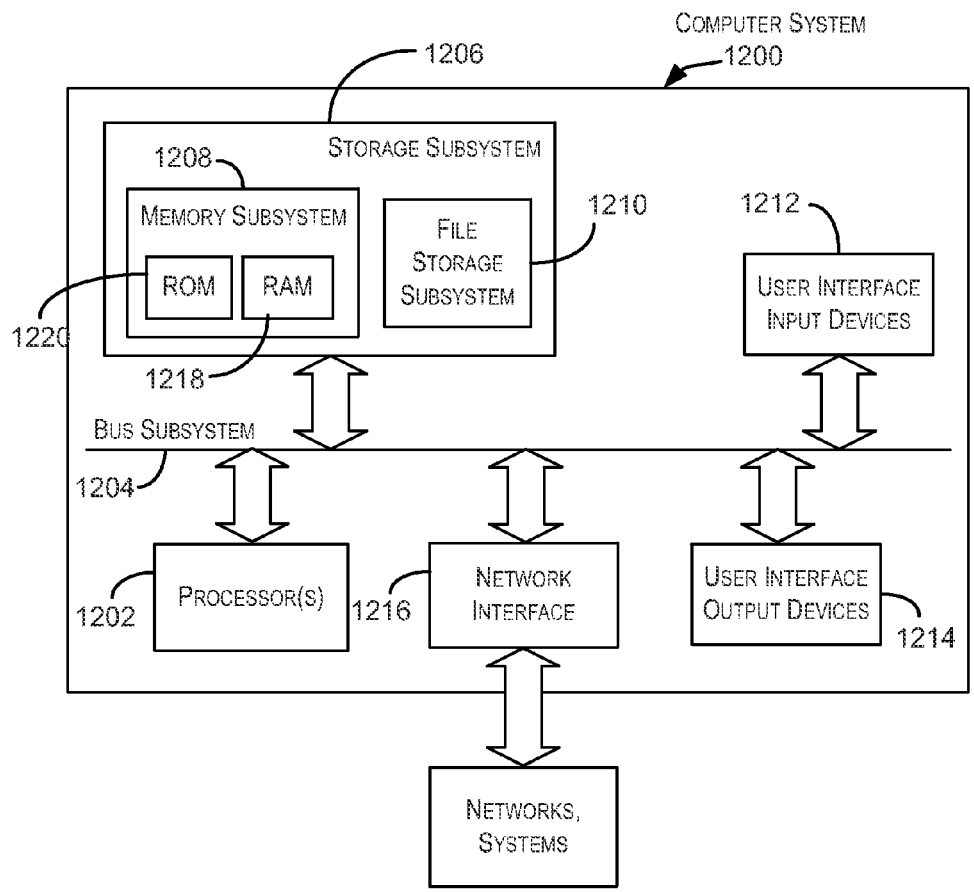
FIG. 12 shows an illustrative example of a computer system that may be used to implement various embodiments of the present disclosure.

FIG. 12 is a simplified block diagram of a computer system 1200 that may be used to practice an embodiment of the present invention. Computer system 1200 may serve as a processing system 1202 or a client system 1220 depicted in FIG. 12. As shown in FIG. 12, computer system 1200 includes a processor 1202 that communicates with a number of peripheral subsystems via a bus subsystem 1204. These peripheral subsystems may include a storage subsystem 1206, comprising a memory subsystem 1208 and a file storage subsystem 1210, user interface input devices 1212, user interface output devices 1214, and a network interface subsystem 1216.

Bus subsystem 1204 provides a mechanism for letting the various components and subsystems of computer system 1200 communicate with each other as intended. Although bus subsystem 1204 is shown schematically as a single bus, alternative embodiments of the bus subsystem may utilize multiple busses.

Network interface subsystem 1216 provides an interface to other computer systems, networks, and portals. Network interface subsystem 1216 serves as an interface for receiving data from and transmitting data to other systems from computer system 1200.

User interface input devices 1212 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 1200. A user may use an input device to provide to configure systems that perform the various methods described herein and to otherwise work with such systems.

User interface output devices 1214 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1200. Results of system tests, such as outputs from a DSS may be displayed on an output device.

Storage subsystem 1206 provides a computer-readable medium for storing the basic programming and data constructs that provide the functionality of the present invention. Software (programs, code modules, instructions) that when executed by a processor provide the functionality of the present invention may be stored in storage subsystem 1206. These software modules or instructions may be executed by processor(s) 1202. Storage subsystem 1206 may also provide a repository for storing data used in accordance with the present invention, for example, the data stored in the diagnostic data repository. For example, storage subsystem 1206 provides a storage medium for persisting one or more ontologies. Storage subsystem 1206 may comprise memory subsystem 1208 and foe/disk storage subsystem 1210.

Memory subsystem 1208 may include a number of memories including a main random access memory (RAM) 1218 for storage of instructions and data during program execution and a read-only memory (ROM) 1220 in which fixed instructions are stored. File storage subsystem 1210 provides persistent (non-volatile) storage for program and data files, and may include a hard disk drive, a floppy disk drive along with associated removable media, a Compact Disk Read-Only Memory (CD-ROM) drive, an optical drive, removable media cartridges, and other like storage media.

Computer system 1200 can be of various types including a personal computer, a portable computer, a workstation, a network computer, a mainframe, a kiosk, a server or any other data processing system. Due to the ever-changing nature of computers and networks, the description of computer system 1200 depicted in FIG. 12 is intended only as a specific example for purposes of illustrating the preferred embodiment of the computer system. Many other configurations having more or fewer components than the system depicted in FIG. 12 are possible.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of determining system configurations, comprising:
    determining, by a computer system, a set of configurations for a system;
    measuring performance of the system for members of the determined set of configurations;
    creating, based at least in part on the measured performance, a model of the system;
    receiving, from a user, one or more user-specified objective functions, based at least in part on the model of the system;
    identifying one or more configurable parameters related to the system;
    identifying a relationship between the one or more configurable parameters;
    identifying at least one variable constraint related to the system based at least in part on the identified relationship;
    determining a valid set of values to be assigned to the one or more configurable parameters and the at least one variable constraint based at least in part on the identified relationship, wherein the value of the at least one variable constraint maps to the valid set of values assigned to the one or more configurable parameters;
    generating an optimal configuration of the system with respect to the one or more user-specified objective functions based at least in part on the model and the valid set of values assigned to the one or more configurable parameters and the at least one variable constraint; and
    providing the generated optimal configuration for tuning the system.

2. The computer-implemented method of claim 1, further comprising tuning the system according to the optimal configuration.

3. The computer-implemented method of claim 2, further comprising:
    measuring one or more performance characteristics of the tuned system over a period of time;
    calculating, for the one or more performance characteristics, one or more predicted performance characteristics for the period of time; and
    providing a display that compares the measured one or more performance characteristics with the calculated one or more predicted performance characteristics.

4. The computer-implemented method of claim 1, wherein determining the set of configurations includes:
    testing at least a first set of configurations for the system to determine a set of configuration constraints; and
    selecting the set of configurations consistent with the determined set of configuration constraints.

5. The computer-implemented method of claim 4, wherein selecting the set of configurations includes selecting the set of configurations to have a distribution that optimizes one or more distribution metrics.

6. The computer-implemented method of claim 1, wherein measuring performance of the system for each configuration includes:
    configuring the system with the configuration;
    simulating the configured system; and
    measuring one or more performance characteristics of the system.

7. A computing system for determining configurations for a system under test, comprising:
    one or more processors; and
    memory including executable instructions that, when executed by the one or more processors, cause the computing system to implement at least:
    a configuration selector configured to select a set of configurations for the system under test;

an application simulator configured to simulate the system under test under the selected set of configurations and provide, based at least in part on simulating the system under test, performance data for the system under test;

a model creator configured to create, based at least in part on the provided performance data, a model of the system under test; and a model optimizer configured to:

receive, from a user, one or more user-specified objective functions, based at least in part on the model of the system;

identify one or more configurable parameters related to the system;

identify a relationship between the one or more configurable parameters;

identify at least one variable constraint related to the system based at least in part on the identified relationship;

determine a valid set of values to be assigned to the one or more configurable parameters and the at least one variable constraint based at least in part on the identified relationship, wherein the value of the at least one variable constraint maps to the valid set of values assigned to the one or more configurable parameters; and determine an optimal configuration for the system under test that produces an optimal performance of the system with respect to the one or more user-specified objective functions based at least in part on the model and the valid set of values assigned to the one or more configurable parameters and the at least one variable constraint.

8. The computing system of claim 7, wherein the configuration selector includes a configuration validator configured to determine whether configurations are valid and wherein the configuration selector avoids selecting invalid configurations.

9. The computing system of claim 7, wherein the configuration selector includes a classification trainer configured to learn constraints for configurations and wherein the configuration selector selects the set of configurations consistent with the learned constraints.

10. The computing system of claim 7, wherein the configuration selector includes a configuration generator configured to generate valid configurations within a set of constraints and wherein the configuration selector selects the set of configurations from the generated valid configurations.

11. The computing system of claim 7, wherein the system under test is an application on a host.

12. The computing system of claim 7, wherein the configuration selector is configured to select the set of configurations in a manner optimizing one or more configuration distribution metrics.

13. One or more non-transitory computer-readable storage media having collectively stored thereon instructions executable by one or more processors to cause a computer system to at least:

determine a set of configurations for the system;

measure performance of the system for members of the determined set of configurations;

create, based at least in part on the measured performance, a model of the system;

receive, from a user, one or more user-specified objective functions, based at least in part on the model of the system;

identify one or more configurable parameters related to the system;

identify a relationship between the one or more configurable parameters;

identify at least one variable constraint related to the system based at least in part on the identified relationship;

determine a valid set of values to be assigned to the one or more configurable parameters and the at least one variable constraint based at least in part on the identified relationship, wherein the value of the at least one variable constraint maps to the valid set of values assigned to the one or more configurable parameters;

generate an optimal configuration of the system with respect to the one or more user-specified objective functions based at least in part on the model and the valid set of values assigned to the one or more configurable parameters and the at least one variable constraint; and provide the generated optimal configuration for tuning the system.

14. The one or more non-transitory computer-readable storage media of claim 13, wherein determining the set of configurations includes:

testing at least a first set of configurations for the system to determine a set of configuration constraints; and selecting the set of configurations consistent with the determined set of configuration constraints.

15. The one or more non-transitory computer-readable storage media of claim 14, wherein determining the set of constraints includes obtaining a data set that indicates validity of each of the tested first set of configurations and wherein the set of configuration constraints is based at least in part on the obtained data set.

16. The one or more non-transitory computer-readable storage media of claim 14, wherein selecting the set of configurations includes selecting the set of configurations to have a distribution that optimizes one or more distribution metrics.

17. The one or more non-transitory computer-readable storage media of claim 13, wherein measuring performance of the system for each configuration includes:

configuring the system with the configuration;

simulating the configured system; and measuring one or more performance characteristics of the system.

18. The one or more non-transitory computer-readable storage media of claim 17, wherein simulating the configured system includes causing virtual users of the system to interact with the system.

19. The one or more non-transitory computer-readable storage media of claim 13, wherein the set of configurations is a proper subset of a set of possible configurations for the system.

20. The one or more non-transitory computer-readable storage media of claim 13, wherein each configuration comprises a plurality of configurable parameters of the system.

* * * * *

UNITED STATES PATENT AND TRADEMARK OFFICE
CERTIFICATE OF CORRECTION

| | |
|---|---|
| PATENT NO. | : 8,954,309 B2 |
| APPLICATION NO. | : 13/149663 |
| DATED | : February 10, 2015 |
| INVENTOR(S) | : B'Far et al. |

It is certified that error appears in the above-identified patent and that said Letters Patent is hereby corrected as shown below:

On title page 2, in column 2, References Cited under other publications, line 36, delete "the7$^{th}$International" and insert -- the 7$^{th}$ International --, therefor.

On title page 3, in column 2, References Cited under other publications, line 1, delete "12/846,684;" and insert -- 12/846,684, --, therefor.

In the specification

In column 6, line 41, delete "playa" and insert -- play a --, therefor.

In column 6, line 42, after "implemented" insert -- in --.

In column 6, line 49, delete "my flow" and insert -- may flow --, therefor.

In column 7, line 17, delete "DOE" and insert -- DoE --, therefor.

In column 7, line 36, delete "con)" and insert -- control --, therefor.

In column 8, lines 50-51, delete "my be" and insert -- may be --, therefor.

In column 9, line 3, delete "MI-P." and insert -- MLP. --, therefor.

In column 9, line 64, delete "NM." and insert -- JVM. --, therefor.

In column 10, line 14, delete "If" and insert -- If, --, therefor.

In column 11, lines 62-63, delete "performance, in" and insert -- performance. In --, therefor.

In column 14, line 32, before "application" insert -- an --.

Signed and Sealed this
Seventeenth Day of November, 2015

Michelle K. Lee
*Director of the United States Patent and Trademark Office*

Page 1 of 2

CERTIFICATE OF CORRECTION (continued)
U.S. Pat. No. 8,954,309 B2

In the specification

In column 14, line 61, delete "forum" and insert -- for our --, therefor.

In column 15, line 2, delete "Audze-Egiais" and insert -- Audze-Eglais --, therefor.

In column 15, line 7, delete "points, if" and insert -- points. If --, therefor.

In column 15, line 44, delete "OLE" and insert -- OLH --, therefor.

In column 16, line 41, delete "white" and insert -- while --, therefor.

In column 16, line 43, delete "OLE" and insert -- OLH --, therefor.

In column 17, line 54, delete "swami" and insert -- swarm --, therefor.

In column 17, line 58, delete "Audze-Elais" and insert -- Audze-Eglais --, therefor.

In column 17, line 64, delete "hut" and insert -- but --, therefor.

In column 18, line 5, delete "abounded" and insert -- a bounded --, therefor.

In column 20, line 30, delete "foe/disk" and insert -- file/disk --, therefor.